United States Patent
Giusti et al.

(10) Patent No.: US 7,372,247 B1
(45) Date of Patent: May 13, 2008

(54) APPARATUS AND METHOD FOR LOCATING AND MARKING AN UNDERGROUND UTILITY

(75) Inventors: Alex Giusti, Sacramento, CA (US); Derrick Torres, Folsom, CA (US); Michael Roach, Visalia, CA (US)

(73) Assignee: Tri-Site, Inc., Folsom, CA (US)

( * ) Notice: Subject to any disclaimer, the term of this patent is extended or adjusted under 35 U.S.C. 154(b) by 816 days.

(21) Appl. No.: 10/616,861

(22) Filed: Jul. 9, 2003

Related U.S. Application Data

(60) Provisional application No. 60/460,453, filed on Apr. 3, 2003.

(51) Int. Cl.
*G01R 19/00* (2006.01)
*G01R 33/00* (2006.01)

(52) U.S. Cl. .................. 324/67; 324/326; 324/329

(58) Field of Classification Search ............... 324/326, 324/329–331, 345, 228, 66–67, 344; 340/854.3, 340/854.6; 427/136–137
See application file for complete search history.

(56) References Cited

U.S. PATENT DOCUMENTS

| | | |
|---|---|---|
| 3,831,173 A | 8/1974 | Lerner |
| 4,162,862 A | 7/1979 | Harker et al. |
| 4,219,092 A | 8/1980 | Richter |
| 4,236,950 A | 12/1980 | Eigenmann |
| 4,518,044 A | 5/1985 | Wiegardt et al. |
| 4,738,060 A | 4/1988 | Marthaler et al. |
| 4,892,251 A | 1/1990 | Bresnen |
| 5,025,150 A | 6/1991 | Oldham et al. |
| 5,054,959 A | 10/1991 | Wilson et al. |
| 5,056,454 A | 10/1991 | Turner |
| 5,169,262 A | 12/1992 | Wilson et al. |
| 5,203,923 A | 4/1993 | Hartman |
| 5,549,166 A | 8/1996 | Orbach et al. |
| 5,557,277 A | 9/1996 | Tricoles et al. |
| 5,568,785 A | 10/1996 | Hazen |
| 5,576,973 A | 11/1996 | Haddy |
| 5,629,626 A | 5/1997 | Russell et al. |
| 5,918,565 A | 7/1999 | Casas |
| 6,026,135 A | 2/2000 | McFee et al. |
| 6,053,260 A * | 4/2000 | Boon et al. ............ 173/90 |
| 6,061,940 A | 5/2000 | Rice |

(Continued)

OTHER PUBLICATIONS http://www.naevageophysics.com/utility.html; Naeva Geophysics, Inc., pp. 1 & 2, Jan. 23, 2003.

(Continued)

*Primary Examiner*—Bot LeDynh
(74) *Attorney, Agent, or Firm*—John P. O'Banion

(57) ABSTRACT

An apparatus and method to locate and mark the surface position of an underground utility while maneuvering along the path of the utility. The apparatus uses an underground utility detector that responds to the location of an underground utility to continually position a carriage proximate vertical of the utility. Marker systems are aligned with the carriage and apply either a unique paint symbol on pavement or a spike in the ground. The apparatus is configured to use an underground utility detector or positioning equipment that generate positional signals. The apparatus may be configured to mark utility positions at predetermined intervals and mark utility offset positions. The apparatus may be attached to a vehicle, towed by a vehicle, motorized or propelled by a person.

33 Claims, 23 Drawing Sheets

U.S. PATENT DOCUMENTS

| | | | |
|---|---|---|---|
| 6,095,081 | A | 8/2000 | Gochenour |
| 6,097,189 | A | 8/2000 | Arndt et al. |
| 6,188,221 | B1 | 2/2001 | Van de Kop et al. |
| 6,195,922 | B1 | 3/2001 | Stump |
| 6,333,631 | B1 | 12/2001 | Das et al. |
| 6,356,082 | B1 | 3/2002 | Alkire et al. |
| 6,437,572 | B1 | 8/2002 | Vokey |
| 6,462,696 | B1 | 10/2002 | Gorman |
| 6,723,375 | B2 * | 4/2004 | Zeck et al. .................. 427/136 |
| 2002/0130806 | A1 | 9/2002 | Taylor, Jr. et al. |
| 2003/0184300 | A1 * | 10/2003 | Bigelow ..................... 324/326 |

OTHER PUBLICATIONS http://www.m-bco.com/product/prod320.html; M-B Companies, Inc. of Wisconsin, pp. 1 & 2, Jan. 24, 2003.

http://www.schonstedt.com/newsletter.html; Schonstedt Instrument Company, pp. 1 & 2, Jan. 23, 2003.

http://www.geo-centers.com/products/ground.html; Geo-Centers, pp. 1 & 2, Jan. 23, 2003.

http://www.geo-centers.com/STOLS/index.html; Geo-Centers—Surface Towed Ordnance Locator System, pp. 1 thru 3, Jan. 23, 2003.

http://www.utiliquest.com/press/uti.asp; Utiliquest Holdings Corp., pp. 1 & 2, Feb. 9, 2003.

http://julie1call.com/julie/Utility.htm; Utility Response Process, pp. 1 thru 3, Feb. 9, 2003.

http://www.tbegroup.com/TBEServices/SUES/subengineering.asp; TBE Group, pp. 1 & 2, Feb. 9, 2003.

http://www.gpls.org/truecost/; Great Plains Locating Services, pp. 1 & 2, Feb. 9, 2003.

* cited by examiner

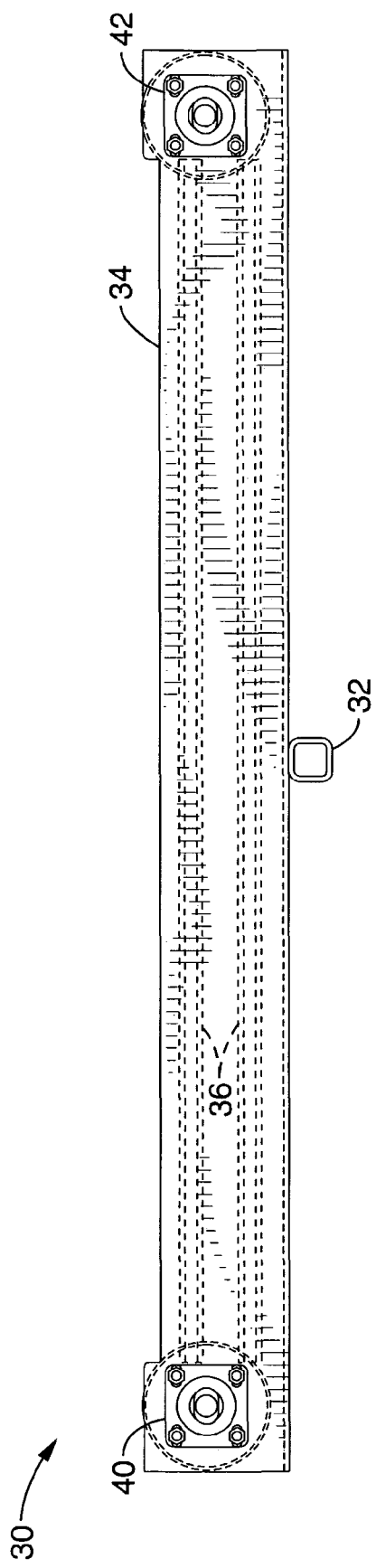
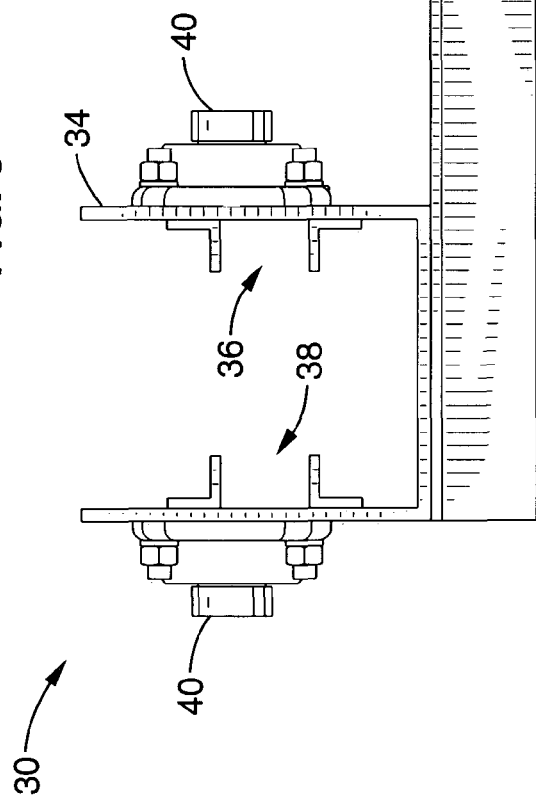
FIG. 3
FIG. 4

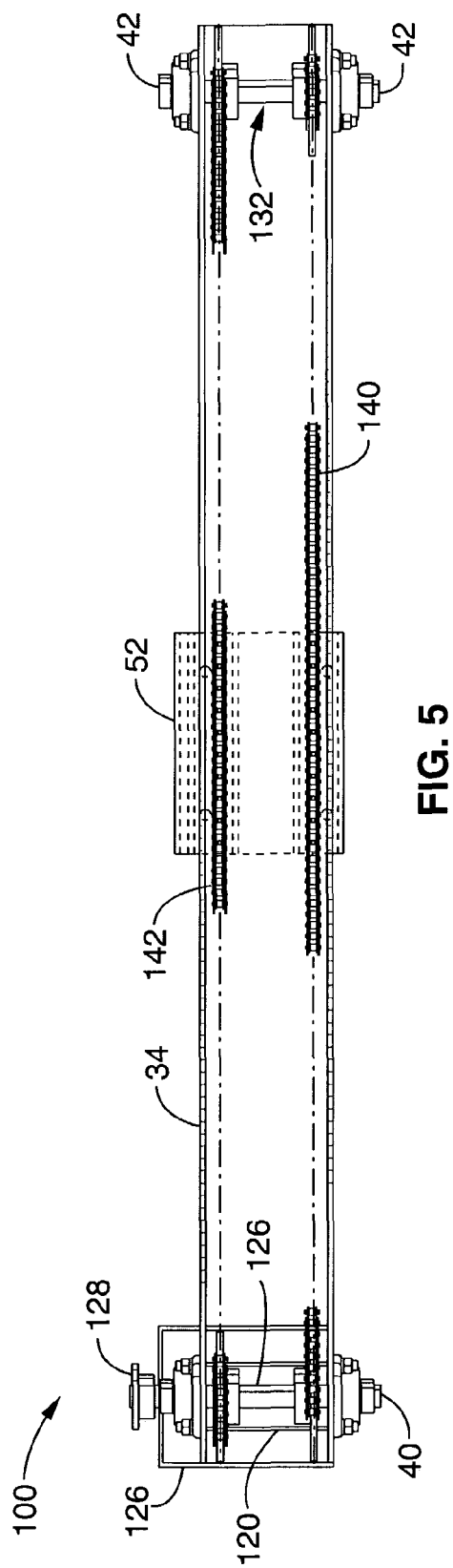
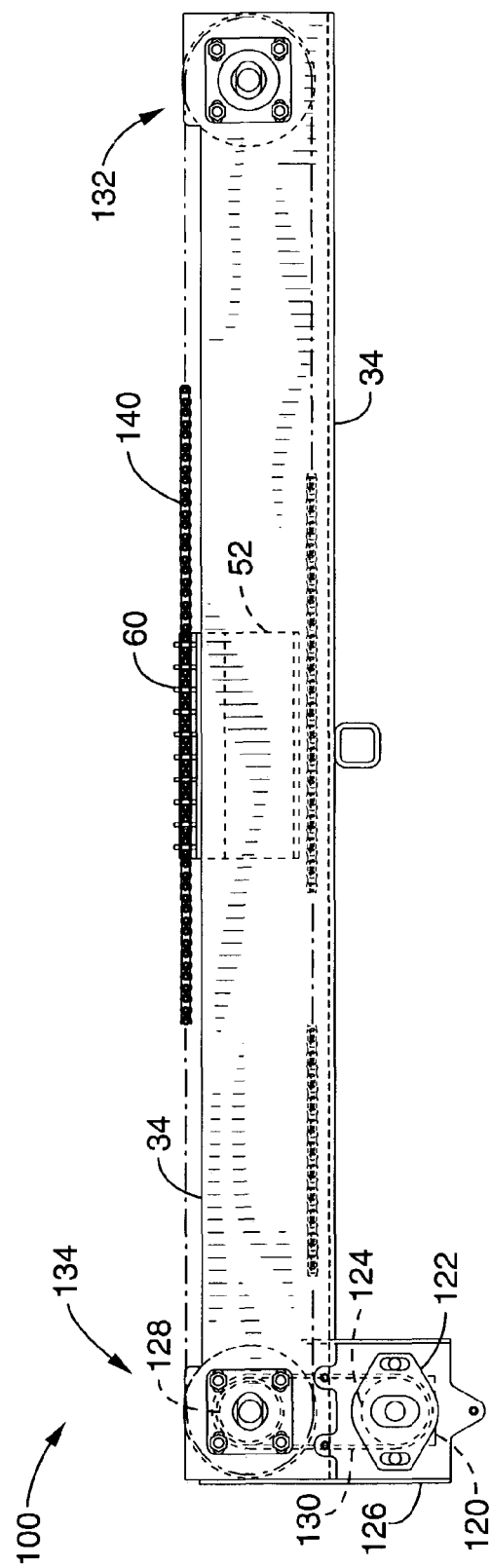
FIG. 5
FIG. 6

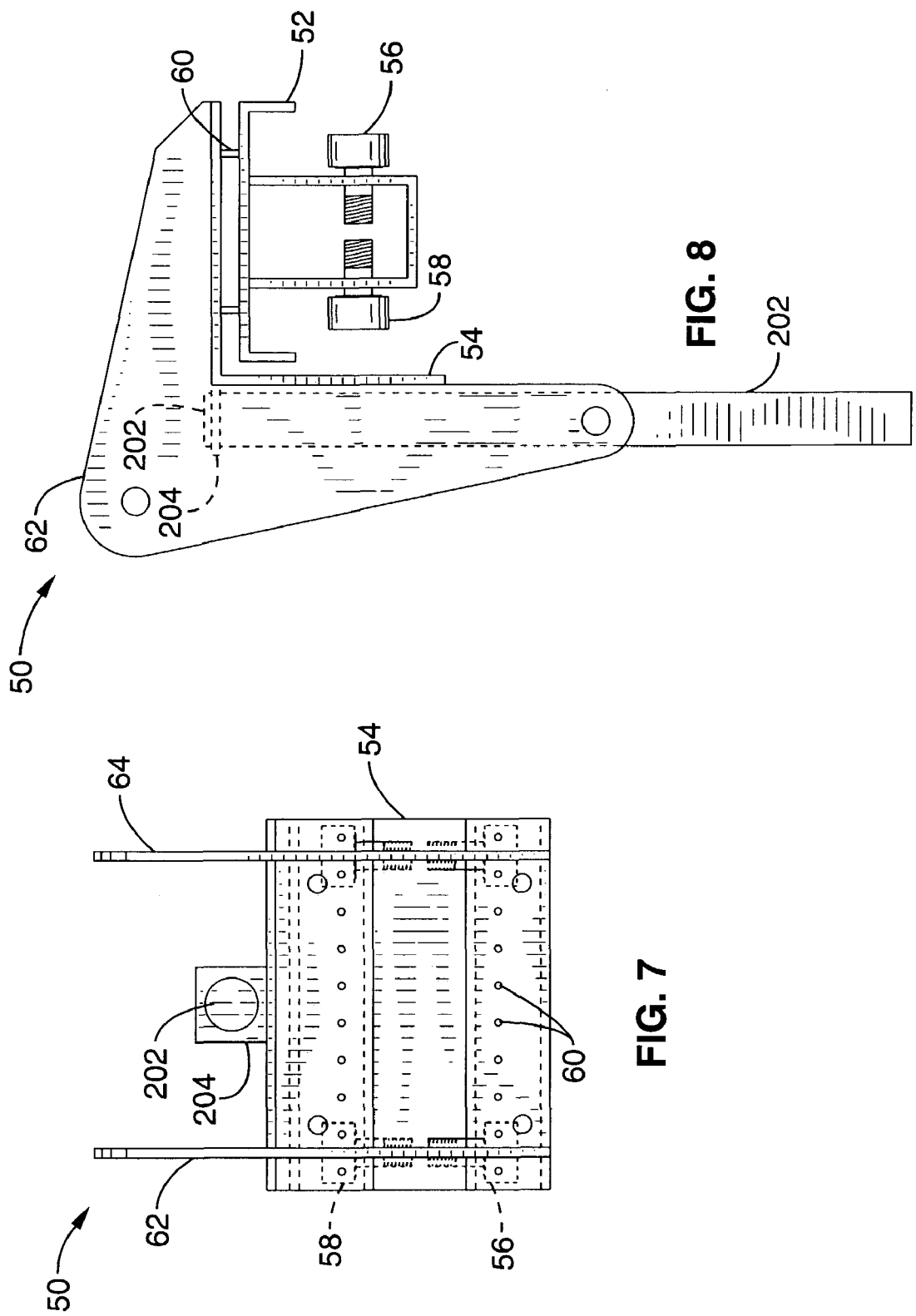

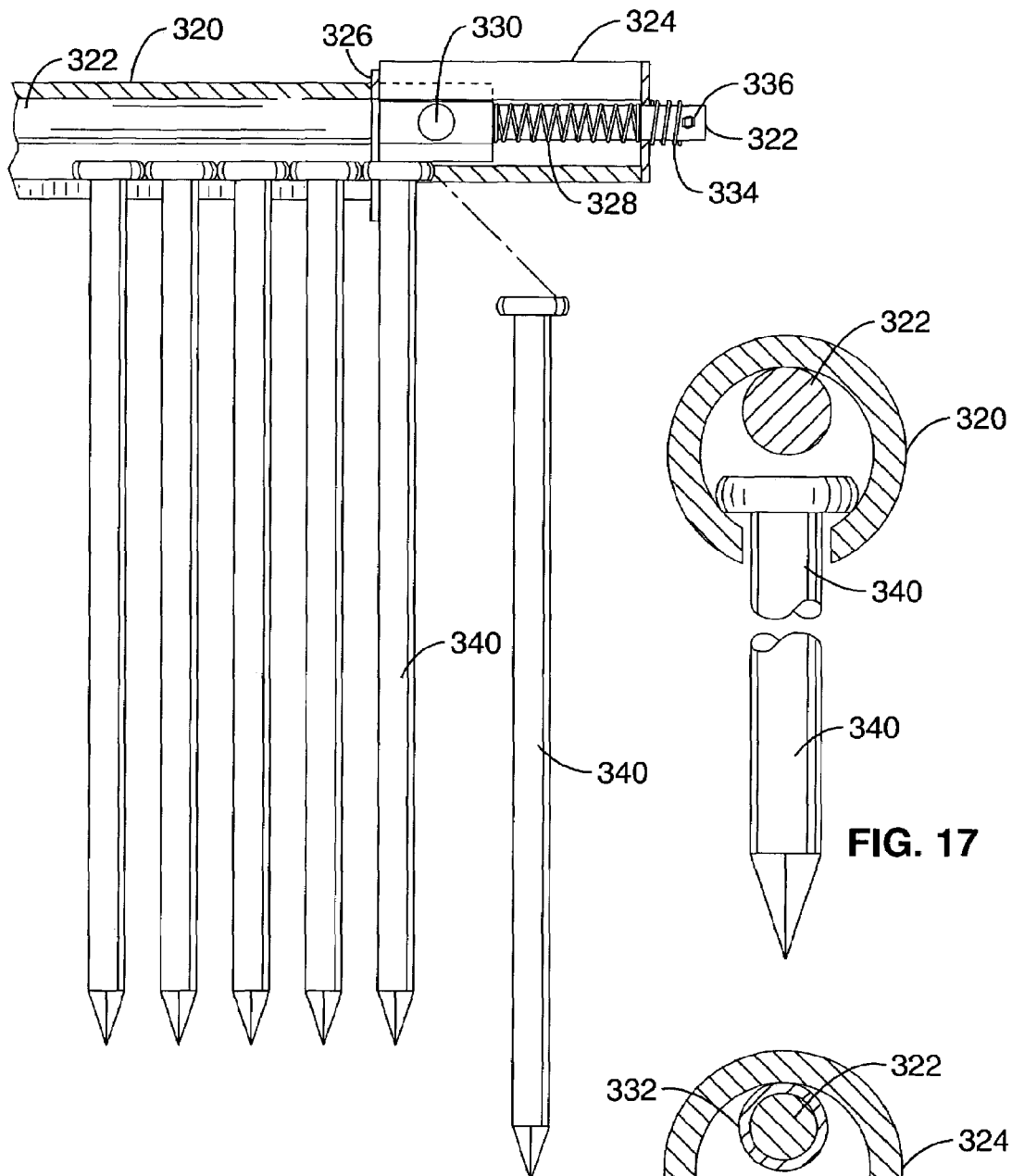
FIG. 16
FIG. 17
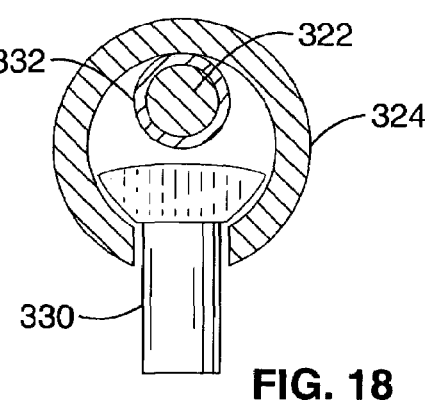
FIG. 18

APPARATUS AND METHOD FOR LOCATING AND MARKING AN UNDERGROUND UTILITY

CROSS-REFERENCE TO RELATED APPLICATIONS

This application claims priority from U.S. provisional, application Ser. No. 60/460,453 filed on Apr. 3, 2003, incorporated herein by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to an apparatus and method to locate and mark the location of an underground utility, and more particularly to an apparatus and method to locate and mark the location of an underground utility on pavement or on ground from a vehicle while in motion.

2. Description of Related Art

Conventional practice for locating an underground utility usually involves a manual technique where a technician carries a handheld sensor with audio feedback to determine the surface location of a particular utility. The technician then marks the location of the utility on the ground with aerosol paint, a flag or both. A specific color paint or flag usually denotes a specific utility. Often the technician writes graffiti-like with paint on the ground or pavement to denote the specific utility. The technician then walks along the general direction of the underground utility for a reasonable distance and repeats the locating and marking process. This manual locating and marking routine requires a knowledgeable operator who can interpret the positional audio signal of a utility detector and is physically capable of walking the utility route and applying aerosol paint and/or flags to the ground. For underground utilities that must be marked for an extended distance, such as along a road or right-of-way, this routine becomes laborious and time-consuming. The technician may also be exposed to moving traffic and other hazards during the routine. The manual locating and marking process is further hindered when adverse terrain and weather conditions are present.

More recent utility locating equipment may use ground penetrating radar, Radio Frequency (RF) marker systems or other electronic locator equipment to determine the utility location and then input the surface location into a Geographic Information System (GIS) using a positional location system such as a Global Positional System or GPS. If any excavation is contemplated, however, the technician would use the GIS information and a GPS receiver to locate the general area of the utility, and then use a hand held sensor to confirm the position on the ground and manually apply the paint or the flags.

There have been several devices designed to improve the manual utility marking process. For example, U.S. Pat. No. 5,918,565 teaches a flag carrier and paint application device that is carried by the technician to make it easier to apply paint or flags as markers. The technician must first locate the utility with a detector and then apply the markers by hand. U.S. Pat. No. 4,738,060 teaches a permanent spike and marker for locating an underground utility over ground. The technician must first locate the utility and then apply the spike marker by hand. Other hand deployed utility markers include those described in U.S. Pat. No. 5,056,454, U.S. Pat. No. 5,568,785 and U.S. Pat. No. 6,095,081. All of these devices require the technician to locate and mark the utility manually.

There are also a number of methods and detectors used to locate underground utilities. For example, U.S. Patent Application No. 2002/0130806 A1 teaches a method for detecting, mapping and locating underground utilities. It does not, however, teach any marking system. U.S. Pat. No. 6,462,696 teaches a man-portable radar system for locating underground utilities. This patent does not teach marking the utility position once it is located. U.S. Pat. No. 6,437,572 teaches a method and apparatus for locating utilities using an interactive RF system. This patent does not teach marking the utility position once it is located. U.S. Pat. No. 6,195,992 teaches a geologic data acquisition system that characterizes the subsurface geology for efficient operation of an excavator. It can also locate underground utilities. This patent discloses a vehicle-towed system to collect and process the subsurface data and the ability to adapt to a plurality of underground locator systems. The patent does not teach any surface marking device or method.

Another class of detection and marking devices are designed to discover and mark buried hazards such as radioactive deposits or land mines. These devices, however, are not for use with continuous linear underground utility systems. For example, U.S. Pat. No. 5,025,150 discloses a survey vehicle that detects radioactive sources in the ground and marks their location with a spot of paint. The apparatus described in that patent uses multiple detectors to locate individual radioactive sources in a target area and a paint applicator for each detector to mark the surface with a spot of paint. This device does not teach detecting or marking the position or path of an underground utility. U.S. Pat. No. 6,026,135 discloses a multi-sensor, vehicle-mounted land mine detector. This device is designed to detect and confirm a land mine location and then temporarily mark the location with a semi-solid gel. The device remains motionless while confirming and marking the location. This patent does not teach detecting or marking a linear underground utility system.

Other detection and marking devices are used to repaint traffic lines on roads and highways. For example, U.S. Pat. No. 5,169,262 discloses a traffic line repainting apparatus that attaches to a vehicle, optically detects old paint, and applies new paint to the same location. That device depends on an optical sensor to detect old paint. The patent does not teach applying a new mark, a unique mark or marking a non pavement surface. U.S. Pat. No. 5,203,923 shows a traffic line repainting apparatus that uses a paint detector and a paint applicator. That device repaints based on optical detection of previous paint on pavement and does not teach underground utility detection, unique symbol marking or use on a non-pavement surface.

Accordingly, there is a need for an apparatus and method that automates locating and marking underground utilities. The present invention satisfies those needs, as well as others, and overcomes deficiencies inherent in previously developed devices and methods for locating and marking underground utilities.

BRIEF SUMMARY OF THE INVENTION

The present invention pertains to an apparatus and method to locate and mark the surface position of an underground utility while maneuvering along the general path of the utility. The apparatus is configured to apply a unique paint symbol on pavement or place a spike in the ground. The apparatus may be configured to use any of a plurality of underground utility detectors or mapping systems that provide positional signals. The apparatus may be coupled to a vehicle, be self propelled or be propelled by a person. The type of underground utility that can be located and marked with the apparatus may include, but is not limited to, a pipeline, water line, gas line, steam line, sewer line, electric line, conduit, tracer line or communication line including fiber optic. Underground means the utility location is not apparent on the surface or during excavation and by way of example and not of limitation, may be located in the ground, in buried conduit, under pavement, embedded in pavement, under a railway, under a floor covering or embedded in a structure, floor or a slab.

According to an aspect of the invention, an apparatus for locating and marking an underground utility generally comprises: (1) a support structure in the form of a chassis, (2) a carriage moveably coupled to the chassis, (3) a carriage actuator that positions the carriage relative to the chassis in response to a positional signal, (4) a controller that receives positional signals from a detector and transmits control signals, (5) a detector that can determine the vertical surface position of an underground utility relative to the position of the carriage and transmit positional signals to the controller, and (6) a surface marking system aligned with the carriage and configured to mark the surface in response to control signals from the controller. According to another aspect of the present invention there is a painting system for marking pavement and/or a spike driver system for marking the ground.

By way of example, and not of limitation, in one embodiment the chassis is configured to be coupled to a vehicle or otherwise maneuvered over the general path of an underground utility. The carriage is coupled to the chassis so that it can move lateral to the direction of movement of the vehicle. The sensor of an underground utility detector is coupled to the carriage and configured to detect the vertical surface position of an underground utility. As the vehicle moves forward, the vertical surface position of the utility is continually updated through the detector to the controller which responds by signaling the carriage actuator to position the carriage vertically over the utility. The marking assemblies are configured to stay aligned with the carriage position. The controller signals the painting system to place a paint symbol on pavement or the spike driver system to drive a spike into the ground.

According to another aspect of the invention, a painting system for use with the locating apparatus generally comprises: (1) a painting support structure, (2) a paint application assembly, (3) a template in the form of a drum, (4) a surface contact wheel coupled to the template, and (5) an actuator that positions the support structure for marking. In this embodiment, a control signal from the controller initiates a marking cycle consisting essentially of positioning the painting support structure until the contact wheel is in contact with the surface, initiating the flow of paint downward while the template drum rotates beneath the flow of paint, and returning the support assembly to a neutral position when marking is complete.

According to a still further aspect of the invention, a spike driver system for use with the locating apparatus generally comprises: (1) a spike support structure, (2) a spike storage magazine, (3) a spike receiver coupled to the spike storage magazine, (4) a spike driver coupled to the spike receiver that drives a spike downward through the spike receiver and into the ground in response to signals from the controller, and, (5) an actuator that positions the spike receiver proximate to the ground. In this embodiment, a control signal from the controller initiates a marking cycle consisting essentially of positioning the spike receiver near the ground, driving a spike downward with the spike driver, then returning the spike receiver to a neutral position and loading another spike into the spike receiver.

According to a further aspect of the invention, the controller may also receive input from the operator through a control panel to set the marking parameters or initiate a marking cycle and the controller may transmit positional and operational status to a driver display to guide a driver over the utility path. It will be appreciated that the controller may also receive input from a vehicle odometer or GPS system to apply marks at predetermined intervals. It will be further appreciated that the controller may communicate with the control panel and driver display through a direct wired system or a wireless system.

In one embodiment, the present invention applies one mark at a time to identify the vertical surface position of a utility. It will be appreciated that in another embodiment of the invention, additional marks to denote offset positions of a utility location may be deployed simultaneously using paint symbols, continuous paint stripes, spikes or a combination. In an embodiment of the present invention, paint is applied through the template by activating an aerosol can of paint. It will be appreciated that a pressurized paint delivery system may also be used to apply paint through the template. It will be further appreciated that the invention may be configured so two or more utilities may be marked in succession using multiple symbol templates or multiple paint colors or multiple types of spikes. The present invention uses spikes with attached whiskers to mark the ground. It will be appreciated, however, that other types of spikes, flags or devices may be used to mark the ground including but not limited to standard nails, aluminum nails, stainless steel nails reflective head spikes, inscripted spikes, and spikes embedded with a memory chip, signal generator or transponder. It will also be appreciated that an embodiment of the invention may be implemented with no marking system wherein a mark is applied manually with reference to the carriage position. The present invention may also be implemented with only a paint marking system or with only a spike driver system or with another system for applying surface marks. It will be further appreciated that the present invention may apply other surface marks including but not limited to adhesive tape, expanding foam, adhesive road reflectors, chalk and lime. It will also be appreciated that the apparatus may be configured to come to a stop briefly to apply a mark.

In one embodiment, the present invention uses a radio frequency (RF) detector. A radio signal is placed on the utility line directly or on an adjacent tracer line. The sensor of the detector receives the RF signal and determines the position of the underground utility relative to the vertical surface position. It will be appreciated that other detectors such as ground penetrating radar, sonic detectors and electromagnetic detectors may be used with the present invention. It will also be appreciated that the present invention may be used with a combination mapping system and a global positioning system (GPS) receiver coupled to the carriage to provide positional signals to the controller. It will be further appreciated that the detector may be configured to locate two or more adjacent utilities in succession and while the apparatus is in motion.

In another embodiment, the utility detector sensor in the present invention is coupled to the carriage to provide positional feedback to the controller denoting the position of the carriage relative to the utility. It will be appreciated that a fixed sensor array that does not align with the carriage position may be used to provide positional signals to the controller to position the carriage.

In one embodiment, the present invention uses a carriage moving on a chassis to provide the lateral range and positioning of the marking systems. It will be appreciated that an articulating arm assembly may also be used to indicate the vertical position of an underground utility and provide the lateral motion and positioning of the marking systems relative to the chassis. Another embodiment of this invention replaces the carriage and carriage actuator with means to maneuver the chassis directly over the vertical surface position of the utility.

In still another embodiment, the carriage actuator of the present invention is powered hydraulically and uses a chain and gear assembly to position the carriage. It will be appreciated that a carriage actuator may also be powered pneumatically, kinetically through vehicle motion or electrically through motors. It will also be appreciated that a carriage actuator may position the carriage through a belt and pulley system, rack and pinion gear system or a jack screw and nut system.

In still another embodiment, the chassis of the present invention is configured to be coupled to a utility vehicle through a hitch coupling. It will be appreciated that the chassis may be coupled front, back or to the side of a vehicle, on a trailer or on a cart propelled by a person. It will be further appreciated that a chassis could extend to the side of a vehicle such as a utility vehicle or a rail road vehicle. It will also be appreciated that other vehicles may be used such as an all terrain vehicle, or the apparatus may be self-propelled.

An aspect of the invention is to locate and mark an underground utility precisely, quickly and cost-effectively while the invention is in motion.

Another aspect of the invention is to locate and mark an underground utility while operating a moving vehicle.

A further aspect of the invention is to mark the utility location on the ground with a spike.

A still further aspect of the invention is to quickly change between paint marking and spike marking as the surface over the utility changes.

Another aspect of the invention is to automate the process of detecting and marking the surface position of an underground utility.

A further aspect of the invention is to mark the location of a utility at predetermined intervals.

A still further aspect of the invention is to safely mark the surface position of an underground utility while subject to adverse weather, traffic hazards or adverse terrain.

Another aspect of the invention is to increase speed and distance for a person to locate and mark an underground utility.

A further aspect of the invention is to reduce vehicle driver fatigue and error by providing a utility marking system that automatically and accurately repositions the marking system while in motion.

A still further aspect of the invention is to accommodate any one of a plurality of underground utility detectors and positioning equipment including but not limited to RF detection, electromagnetic detection, ground penetrating radar, sonic detection and global positioning systems.

Another aspect of the invention is to apply unique paint symbols neatly on pavement to mark the surface location of a utility.

A still further aspect of the invention is to apply a different symbol for each different utility.

A further aspect of the invention is to mark an underground utility over long distances such as along roads, railroads and right of ways in a cost-effective manner.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 3 is a front view of a chassis assembly of the present invention.

FIG. 4 is a side view of the chassis assembly of FIG. 3.

FIG. 5 is a top view of an actuator assembly of the present invention.

FIG. 6 is a front view of the actuator assembly of FIG. 5.

FIG. 7 is a top view of a carriage assembly of the present invention.

FIG. 8 is a side view of the carriage assembly of FIG. 7.

FIG. 16 is a side view of the spike magazine of FIG. 15 shown in the spike loading position.

FIG. 17 is a cross sectional view of a spike magazine according to the present invention shown holding a spike.

FIG. 18 is a cross sectional view of a loading tube according to the present invention showing the spike pusher rod.

DETAILED DESCRIPTION OF THE INVENTION

Referring more specifically to the drawings, for illustrative purposes the present invention is embodied in the apparatus and method(s) generally shown in FIG. 1 through FIG. 28. It will be appreciated that the apparatus may vary as to configuration and as to details of the parts, and that the method(s) may vary as to the specific steps and sequence, without departing from the basic concepts as disclosed herein.

Figure 1:
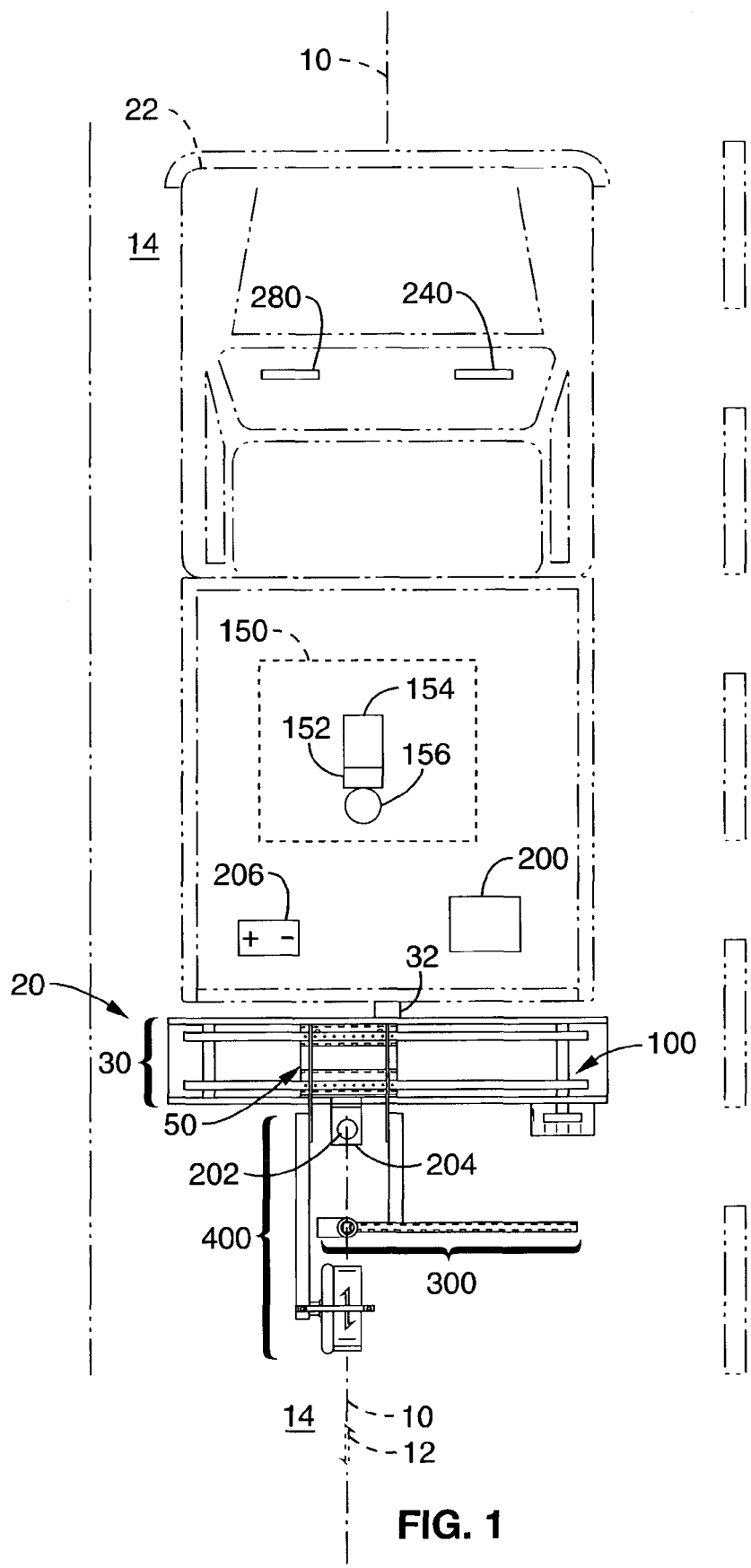
FIG. 1 is a top view of an embodiment of the apparatus of the present invention coupled to a vehicle shown in phantom and schematically illustrating an underground utility being located and marked with a paint symbol on pavement.

FIG. 1 illustrates a utility marking situation in plan view where an underground utility 10 is to be located and its vertical location identified with a paint symbol 12 in preparation for work on or near roadway 14. In a preferred embodiment, a utility marking and locating apparatus 20 according to the present invention is mounted on vehicle 22 to facilitate accurate and rapid marking of roadway pavement 14. Note that details of power, hydraulic and control connections are omitted for clarity. Details of the individual assemblies will be shown in FIG. 3 through FIG. 27. Note also that a typical utility vehicle 22 is illustrated but other vehicles such as all terrain vehicles or a trailer towed by a vehicle may be used in other embodiments of the present invention to support marking and locating apparatus 20.

The utility locating and marking apparatus 20 generally comprises a chassis assembly 30 coupled to vehicle 22 with hitch coupling 32, a carriage assembly 50 coupled to chassis assembly 30 through a carriage actuator assembly 100 that moves within chassis assembly 30 laterally relative to the motion of vehicle 22, and a spike driver system 300 and a painting system 400 that are coupled to carriage assembly 50 and aligned so that a paint symbol 12 will be applied on the centerline of the position of carriage assembly 50.

Carriage actuator assembly 50 is powered by a hydraulic system 150 with a hydraulic pump 152, hydraulic motor 154 and hydraulic accumulator 156 shown mounted in vehicle 22. A controller 200 is connected to a utility detector 202, which is coupled to carriage assembly 50 by means of a utility detector mount 204 and continually transmits positional signals to controller 200. A control panel 240 and a driver display 280 and are mounted in the cab of vehicle 22. Driver display 280 assists the vehicle driver (not shown) in steering a path over underground utility 10. Control panel 240 provides operational inputs to controller 200. Also mounted in vehicle 22 is a power supply 206 which could be a generator, battery or power directly from the vehicle.

As vehicle 22 travels over the general path of underground utility 10, utility detector 202 detects the relative position of underground utility 10 and signals the position to controller 200 which in turn signals carriage actuator assembly 100 to move carriage assembly 50, with utility detector 202, to a position vertical of underground utility 10. As this signal-feedback loop repeats, carriage assembly 50 continually maintains a position vertical of underground utility 10 as vehicle 22 moves along the path of underground utility 10. In response to operator settings on control panel 240, painting system 400 operates to periodically place a paint symbol 12 on pavement 14. This novel arrangement of using positional signals of a utility detector in a feedback loop to continually reposition the detector results in an automated utility locating process and provides accurate positioning of an automated utility marking system. Details of carriage assembly 50 are shown in FIG. 7 and FIG. 8. Details of painting system 400 are shown in FIG. 19 through FIG. 23.

Figure 2:
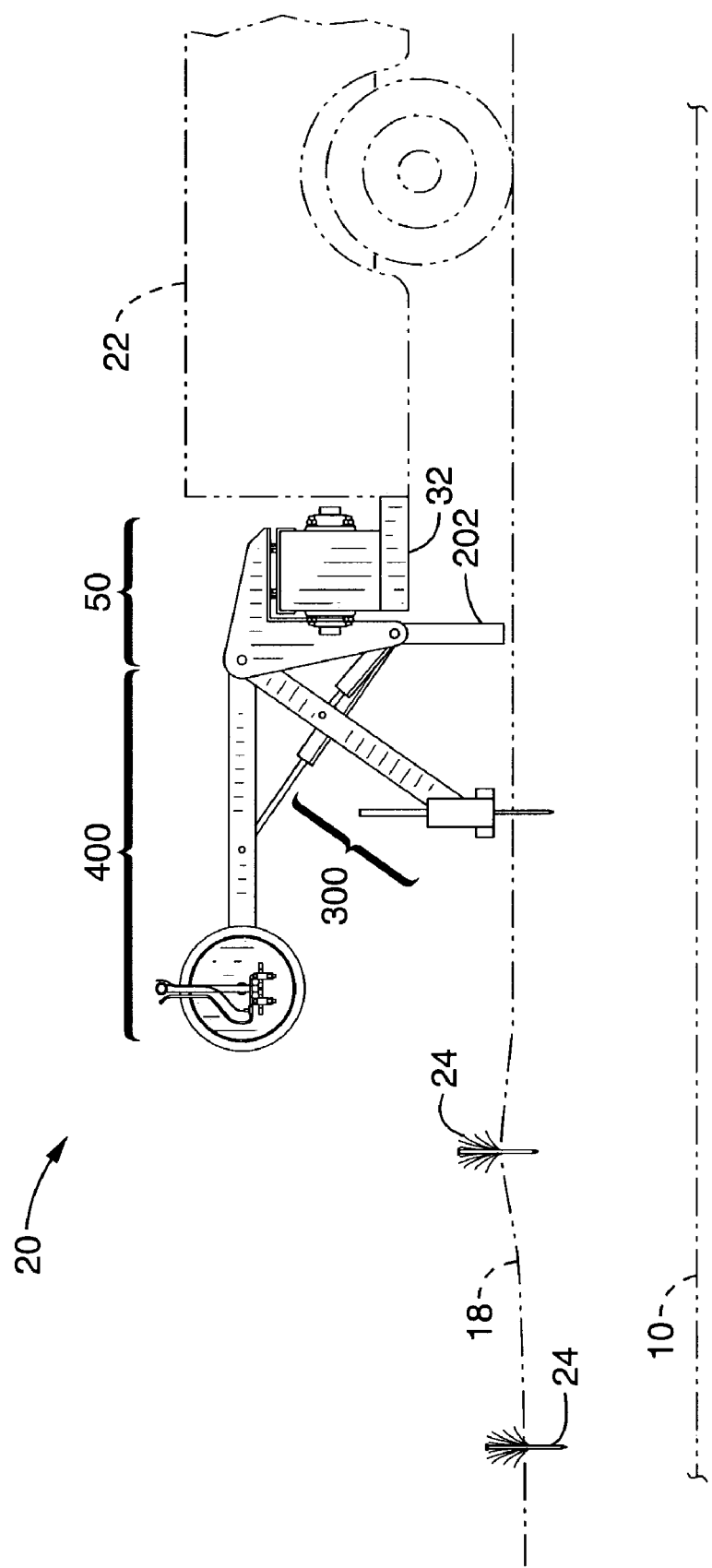
FIG. 2 is a side view of the apparatus shown in FIG. 1 schematically illustrating an underground utility being located and marked with a spike.

FIG. 2 exemplifies a similar utility marking situation as in FIG. 1 but where underground utility 10 is located and its vertical location identified with a spike 24 in ground 18 in preparation for excavation work. Marking and locating apparatus 20 is coupled to vehicle 22 with hitch coupling 32 the same as above in FIG. 1. Marking and locating apparatus 20 operates the same as in FIG. 1 except that, in response to operator settings on control panel 240 (see FIG. 10), spike driver system 300 periodically inserts a marking spike 24 into the ground 18 at a vertical position of underground utility 10. Details of spike driver system 300 are shown in FIG. 12 through FIG. 18.

FIG. 3 is a front view and FIG. 4 is a side view of a preferred embodiment of chassis assembly 30 with carriage assembly 50 and carriage actuator assembly 100 omitted for clarity. In this embodiment, chassis body 34 is a U-shaped metal structure whose length is about the same as the width of vehicle 22 shown in FIG. 1. Chassis body 34 is configured with hitch coupling 32 to mount on the rear of a vehicle 22, but may alternatively be mounted on the front or side of a vehicle or on a trailer. Mounted on the inside walls of chassis body 34 are front roller tracks 36 and rear roller tracks 38 that provide support for carriage assembly 50 (see FIG. 8). Left bearing set 40 and right bearing set 42 are mounted near the left end and right end respectively of chassis body 34.

FIG. 5 is a top view and FIG. 6 is a front view of an embodiment of a carriage actuator assembly 100. Control, hydraulic and power lines are omitted for clarity. A reversible hydraulic motor 120 is coupled to chassis body 34 with motor mount 122. The shaft of motor 120 rotates lower motor drive sprocket 124. Lower motor drive sprocket 124 rotates upper motor sprocket 128 through motor drive chain 130. Motor housing 126 encloses motor 120 and associated moving parts. Right chain idler assembly 132 is supported in right bearing set 42. Left chain drive assembly 134 is supported in left bearing set 40 and is coupled to upper motor sprocket 128. Front drive chain 140 and rear drive chain 142 are configured as a continuous loop around right chain idler assembly 132 and left chain assembly 134. Carriage body 52 (see FIG. 7) couples with front chain 140 and rear chain 142 with chain pins 60. As reversible motor 120 rotates, carriage body 52 moves left or right in chassis body 34. Other actuator systems that translate rotational motion to linear motion may be used, including an electric powered chain drive assembly, a kinetic powered (for example, using a ground contact wheel) chain drive assembly, a hydraulic powered track gear and spur gear assembly, a pneumatic powered track gear and spur gear assembly, an electric powered track gear and spur gear assembly, a kinetic powered track gear and spur gear assembly, a hydraulic powered jack screw and nut assembly a pneumatic powered jack screw and nut assembly, an electric powered jack screw and nut assembly, and a kinetic powered jack screw and nut assembly.

FIG. 7 is a top view and FIG. 8 is a side view of a carriage assembly 50. Carriage body 52 is supported in front roller track 36 and rear roller track 38 (shown in FIG. 4) by front roller bearings 56 and rear roller bearings 58. Chain pins 60 are used to couple carriage body 52 to front drive chain 140 and rear drive chain 142 (shown in FIG. 5), and also couple carriage top member 54 with carriage body 52. Spike driver support 62 and painting system support 64 are coupled to carriage top member 54 to extend rearward relative to vehicle 22 (shown in FIG. 1). Utility detector mount 204 supports utility detector 202 and is coupled to carriage top member 54 to extend rearward and generally on the centerline of carriage body 52 between spike driver support 62 and painting support 64.

Figure 9:
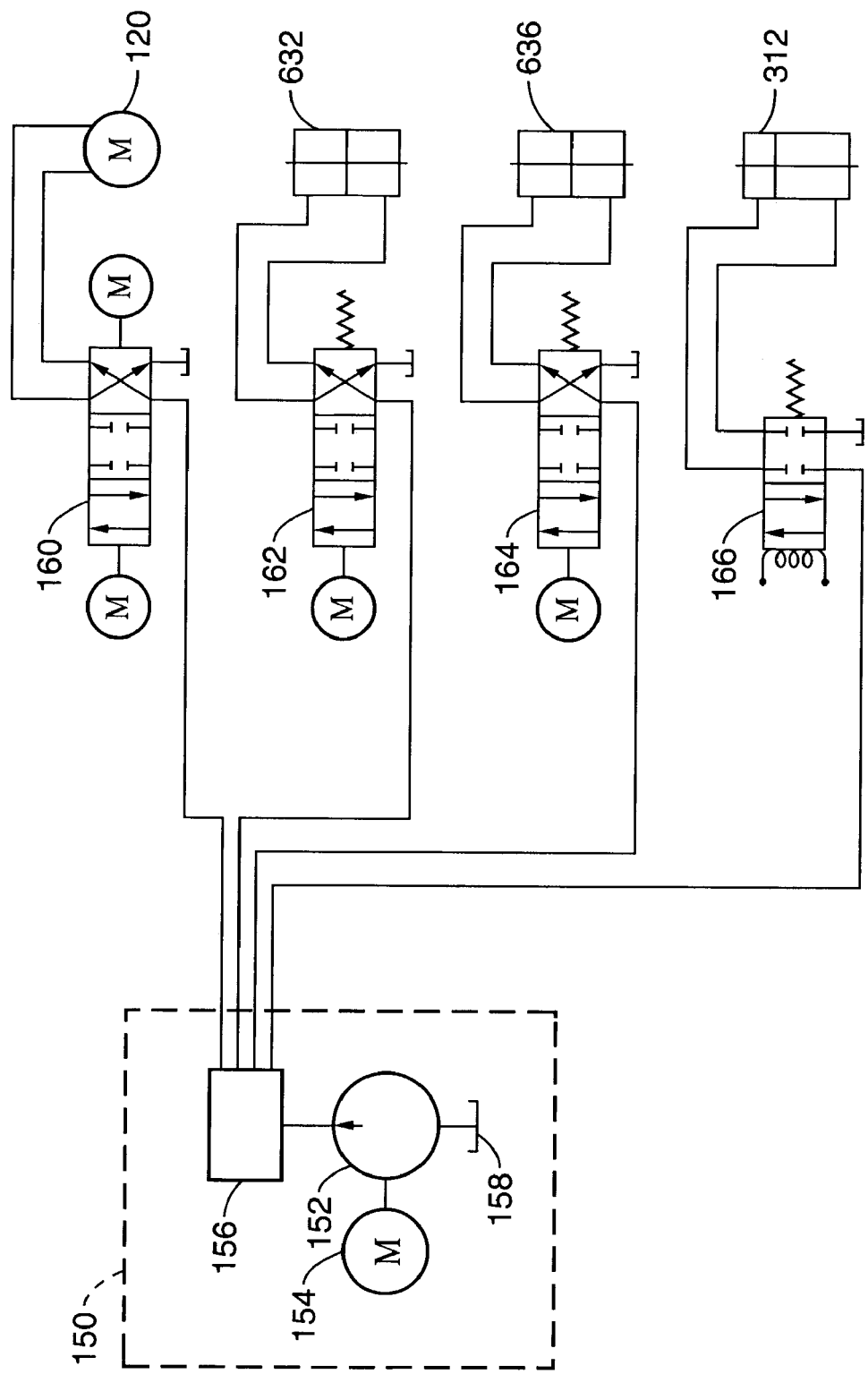
FIG. 9 is a block diagram of a hydraulic system of the present invention.

FIG. 9 is a schematic diagram of a preferred hydraulic system for the present invention. Components such as pressure regulators, filters, gauges, ball valves, safety valves and check valves normally associated with a hydraulic system which would readily be known to one of ordinary skill have been omitted for clarity. Hydraulic system 150 generally comprises a hydraulic pump 152, a pump motor 154, an accumulator 156 and a receiver 158. Hydraulic motor 120 rotates to change position of carriage assembly 50 (see FIG. 7) in response to hydraulic motor control valve 160 in further response from signals from controller 200 (see FIG. 11). Painting system lift ram 632 (see FIG. 25) is raised or lowered in response to signals from controller 200 to painting system lift ram control valve 162. Spike driver system lift ram 636 (see FIG. 25) is raised or lowered in response to signals from controller 200 to spike driver system lift ram control valve 164. Spike driver ram 312 drives a spike 340 (see FIG. 14) in response to a signal from controller 200 to spike ram solenoid valve 166. The aforementioned functions may be accomplished in other embodiments of this invention with a pneumatic system or an electric system. The aforementioned functions may be adapted to other embodiments of the invention using hydraulic valves and hydraulic rams.

Figure 10:
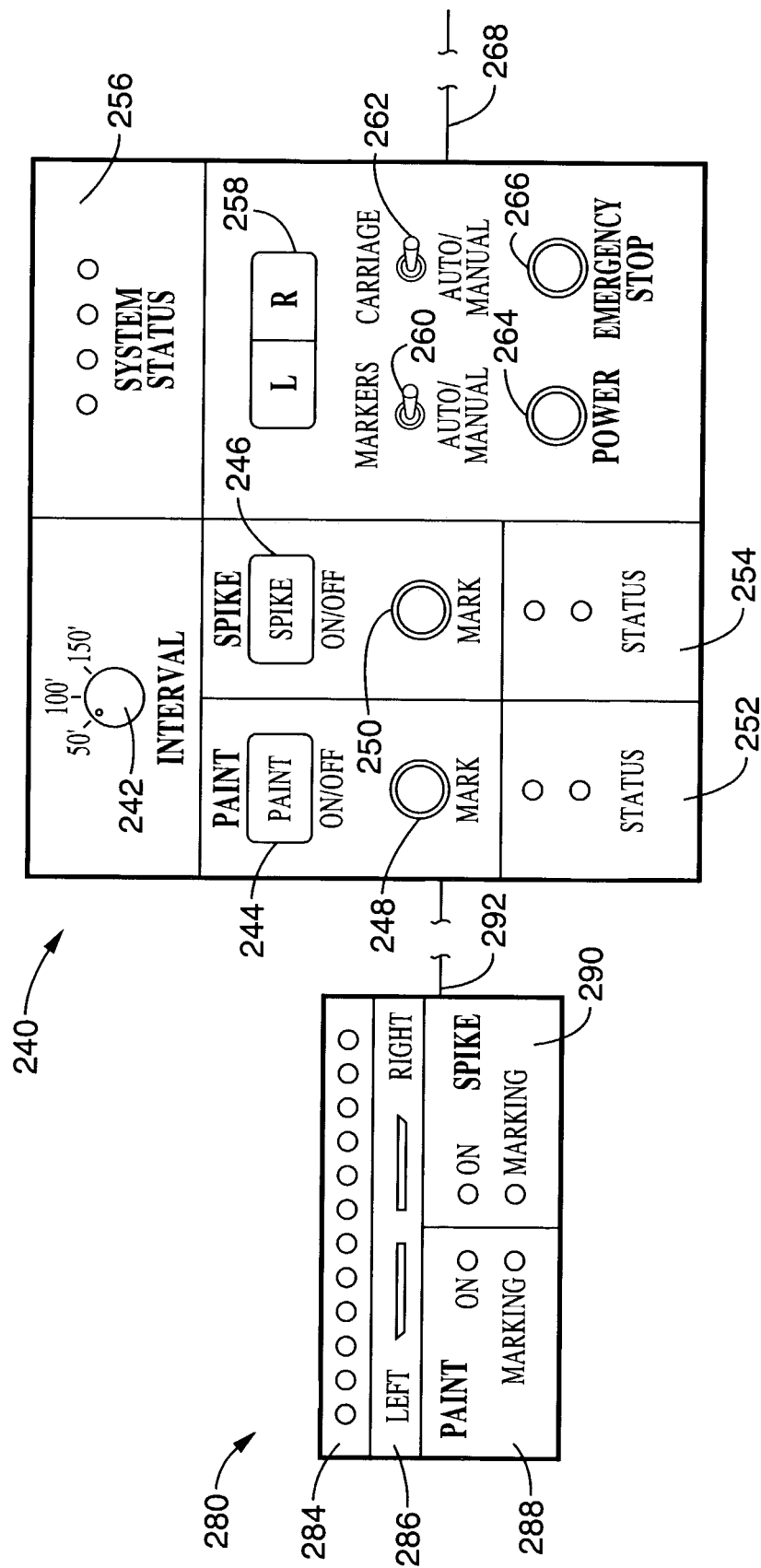
FIG. 10 is an illustration of a control panel with a driver display panel according to an embodiment of the present invention.

FIG. 10 is an illustration of a control panel 240 and a driver display 280 for the present invention. In alternative embodiments, these components may be combined into one system or may be combined with controller 200 (see FIG. 11). Control panel assembly 240 is preferably placed in vehicle 22 (see FIG. 1) to be accessible by an operator who may also be the driver of vehicle 22. Control panel 240 generally has multiple components including an interval selector 242 which allows the operator to select the distance interval between application of a paint symbol (see FIG. 1) or a spike in the ground (see FIG. 2). Push switch 244, lighted when on, turns the painting system 400 (see FIG. 22 and FIG. 23) on or off. Push switch 246, lighted when on, turns the spike driver system 300 (see FIG. 14) on or off. Push button 248 will cycle painting system 400 manually to apply a paint symbol and push button 250 will manually cycle spike driver system 300 and place a spike in the ground. Panel 252 presents status lights for the painting system 400 and panel 254 provides status lights for the spike driver system 300. System status panel 256 presents the operational status of components of marking and locating apparatus 20 (see FIG. 1) including the utility detector 202, the hydraulic system 150 and the power source 206. Rocker switch 258 will manually reposition carriage assembly 50 with carriage actuator assembly 100 (see FIG. 1). Toggle switch 260 places the spike driver system 300 or painting system 400 in automatic or manual only mode. Toggle switch 262 allows the carriage actuator assembly 100 to operate in automatic or manual only mode. Switch 264 energizes apparatus 10 and associated systems. Button 266 is an emergency shutdown switch. Communication link 268 connects control panel assembly 240 to controller 200 (see FIG. 11) and may be a wireless link. Other input components such as analog controls or digital keypads, and other status indicators such as gauges, digital readouts, lights and audio signals may be used in control panel 240 in other embodiments of this invention. Control panel 240 may be integrated with driver display 280 or controller 200.

Driver display 280 is generally configured to be viewed by a driver of a vehicle 22 (see FIG. 1). Carriage position panel 284 is generally a row of LED lights that represent the relative position of carriage assembly 50 within chassis assembly 100 (see FIG. 1). The lights at the extreme left and right end may be a different color to represent that carriage 50 is at the left or right end of travel in chassis assembly 100. A carriage motion indicator panel 286 generally indicates if carriage assembly 50 is in motion to the left or right. Paint system status panel 288 presents operational status of painting system 400 (see FIG. 11). Spike driver system status panel 290 presents operational status of spike driver system 300 (see FIG. 11). Driver display 280 communicates with control panel 240 and controller 200 through communication link 292. Communication link 292 may also be a wireless link.

Figure 11:
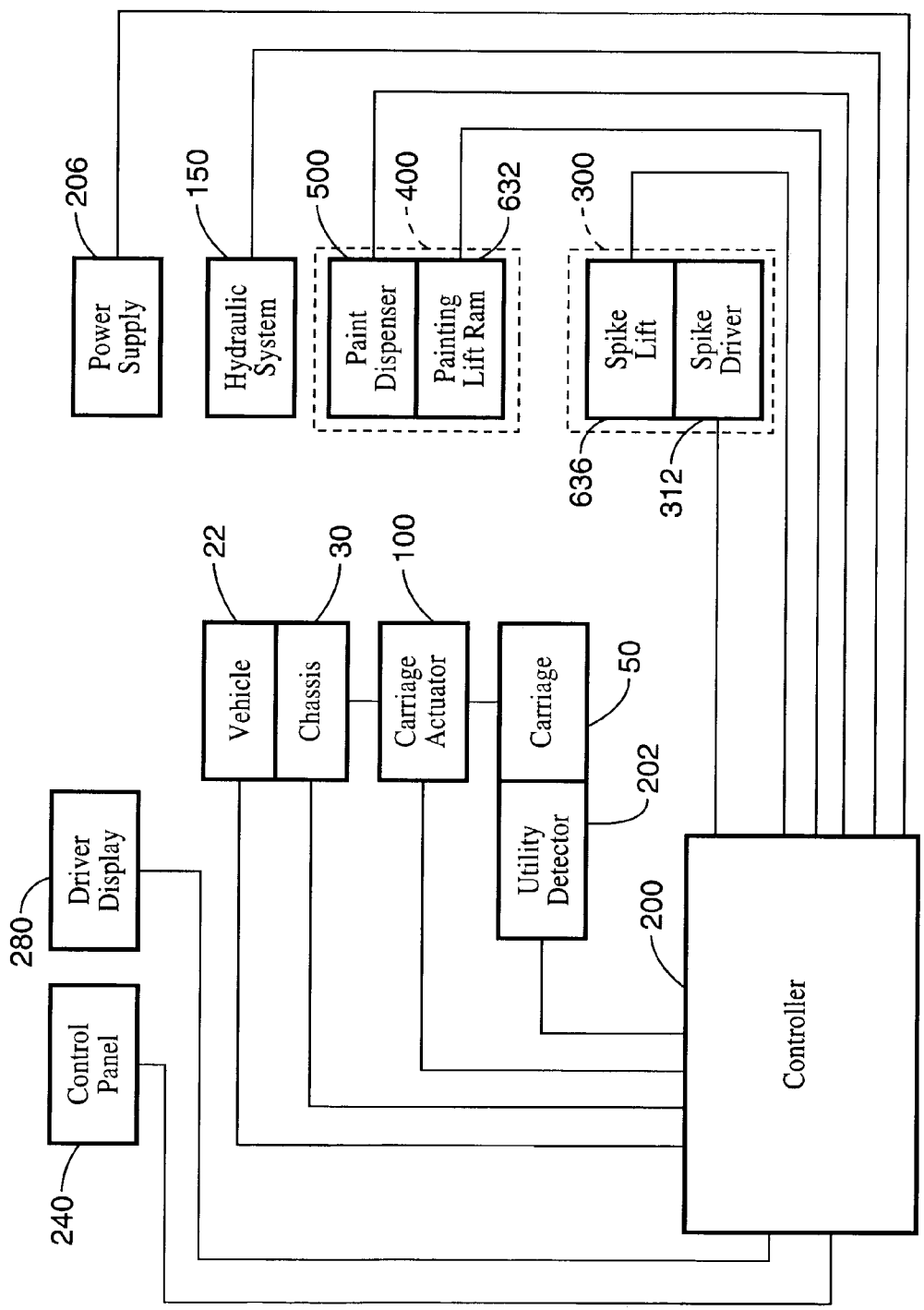
FIG. 11 is a block diagram of a control system of the present invention.

FIG. 11 is a schematic system block diagram to illustrate the control coordination for controller 200 of the present invention. Upon start up, controller 200 checks the operational status of each system including power supply 206, carriage actuator assembly 100, hydraulic system 150, painting system 400, spike driver system 300, utility detector 202, control panel 240 and driver display 280 (see FIG. 1). Controller 200 continues to monitor operational status of these aforementioned systems during operation and presents the status to control panel 240 and driver display panel 280. Controller 200 also determines apparatus operation mode and sequence in response to operator input to control panel 240.

During operation, controller 200 receives positional signals from utility detector 202 and transmits positional signals to carriage actuator assembly 100 to continually position carriage assembly 50 proximate vertical of underground utility 10 and report carriage assembly 50 movement and position to driver display 280. Controller 200 receives speed and distance input from vehicle 22 to calculate intervals for applying paint symbols or spikes. Controller 200 operates paint system 400 to apply a paint symbol through action of painting lift ram 632 and paint dispenser 500 (see FIG. 1), or operates spike driver system 300 to insert a spike in the ground through action of spike lift ram 636 and spike driver 312 (see FIG. 2).

Figure 12:
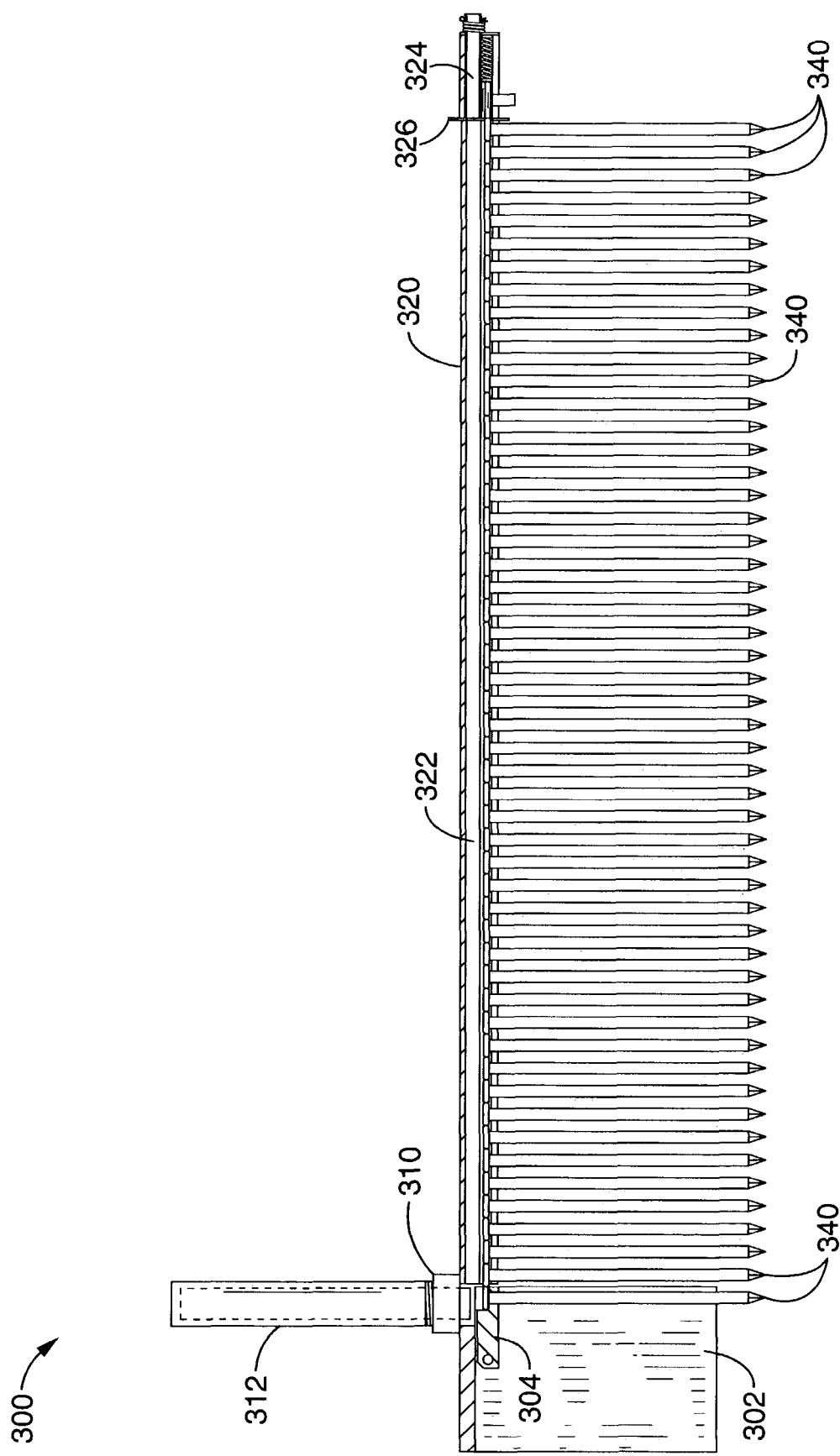
FIG. 12 is a side view of a spike driver system according to the present invention.

FIG. 12 is a side view of a preferred embodiment of a spike driver system 300. Control lines, hydraulic lines and valves have been omitted for clarity. Additional details are shown in FIG. 13 through FIG. 18. Spike receiver 302 is the primary support member and has a cavity to accommodate spike swing arm 304 and couples with spike receiver cap 310. Spike receiver cap 310 supports spike driver ram 312 and spike magazine tube 320. Spike magazine tube 320 is a horizontal tube with a linear slot at the bottom that supports the heads of spikes 340. Retaining rod 322 is welded in the top of the spike magazine tube 320 to keep the heads of spikes 340 from overlapping and supports loading tube 324. Loading tube 324 is secured on retaining rod 322 by retaining spring 334 and retaining pin 336 (see FIG. 15). At the loading end of spike magazine 320, backing plate 326 is welded to magazine tube 320 to facilitate loading with spikes 340. FIG. 15 through FIG. 18 provide details of the loading end of magazine tube 320.

Figure 13:
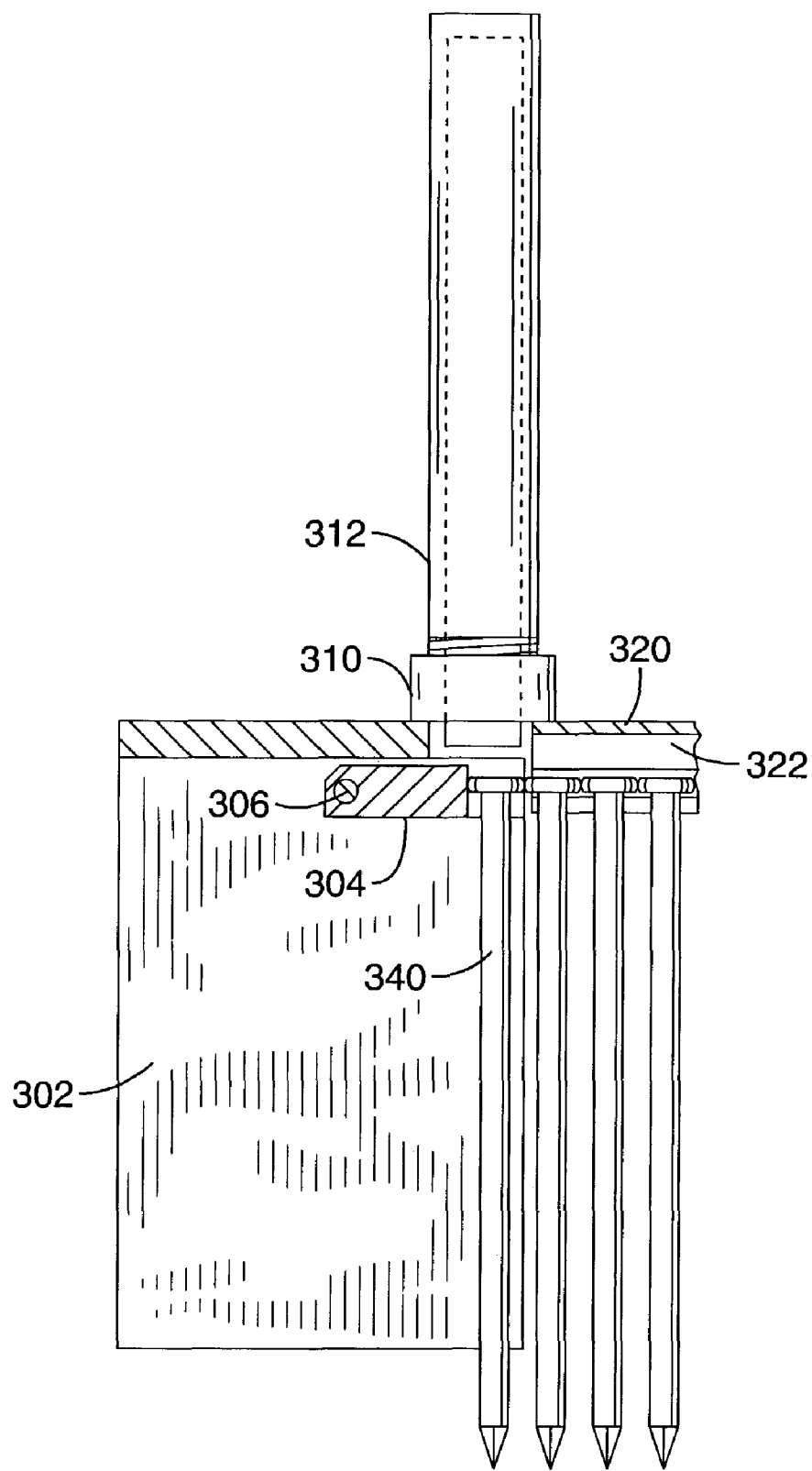
FIG. 13 is a side view of a spike driving system according to the present invention shown in the ready position.

FIG. 13 is a detail of the spike driver assembly 300 in the ready position. Spike driver ram 312 is mounted in spike receiver cap 310. Spike receiver cap 310 supports spike magazine 320 and is mounted on top of spike receiver 302. Spike receiver 302, shown cutaway for clarity, is configured with a cavity to accommodate spike swing arm 304 and spike 340. Spike swing arm 304 is mounted on spike swing arm pin 306 and is held in a horizontal position by swing arm spring 308 (not shown). Spike swing arm 304 is bifurcated and supports the head of spike 340.

Figure 14:
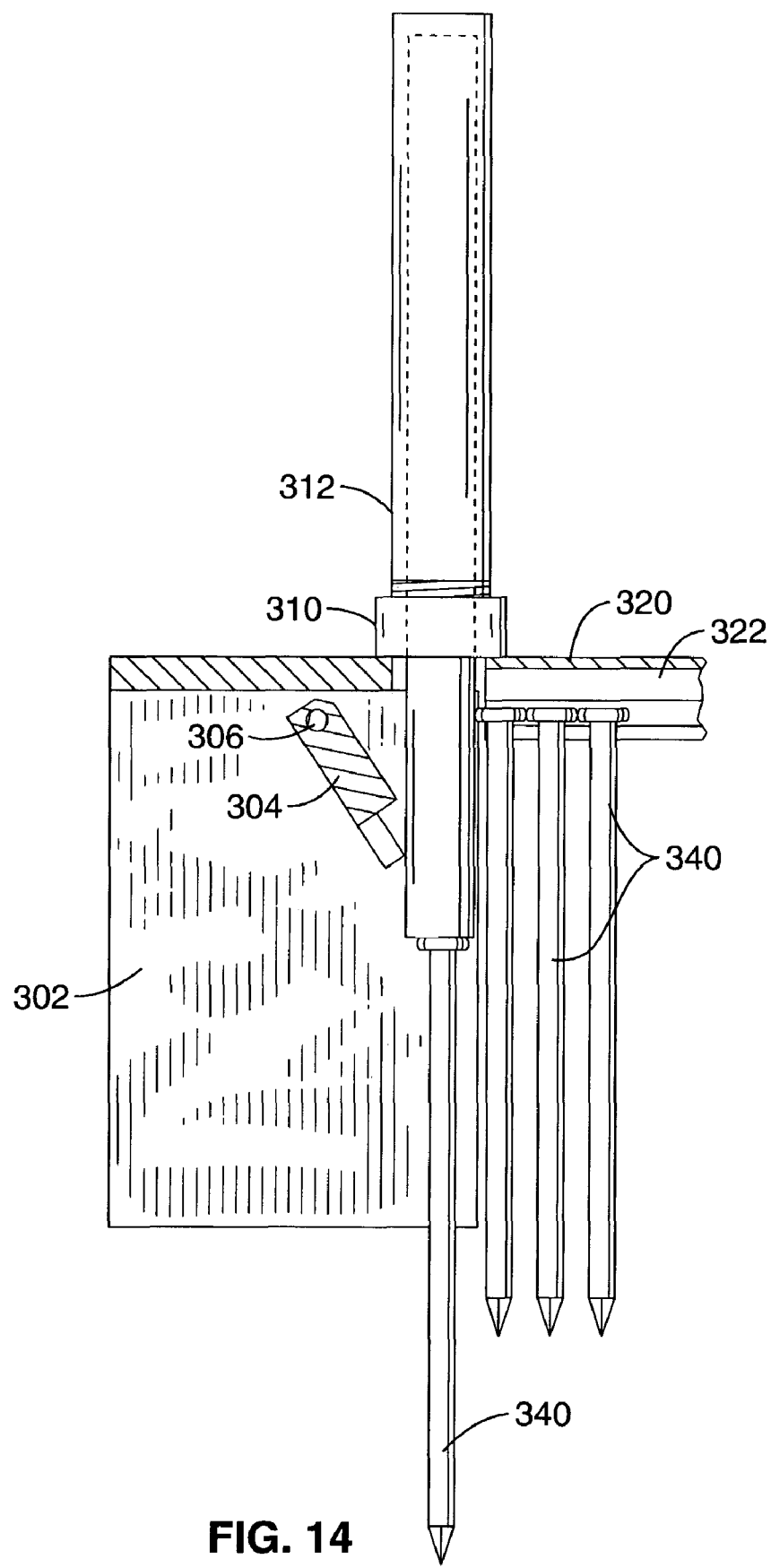
FIG. 14 is a side view of the spike driving system of FIG. 13 shown driving a spike.

FIG. 14 is a detail of the spike driver assembly 300 driving a spike 340. Controller 200 opens hydraulic valve 166 (see FIG. 9) to drive spike driver ram 312 downward. Spike driver ram 312 pushes past swing arm 304 and drives spike 340 out of receiver 302 and into the ground. When spike driver ram 312 returns to the ready position, swing arm 304 returns to a horizontal position and receives the next spike 340 from magazine tube 320.

Figure 15:
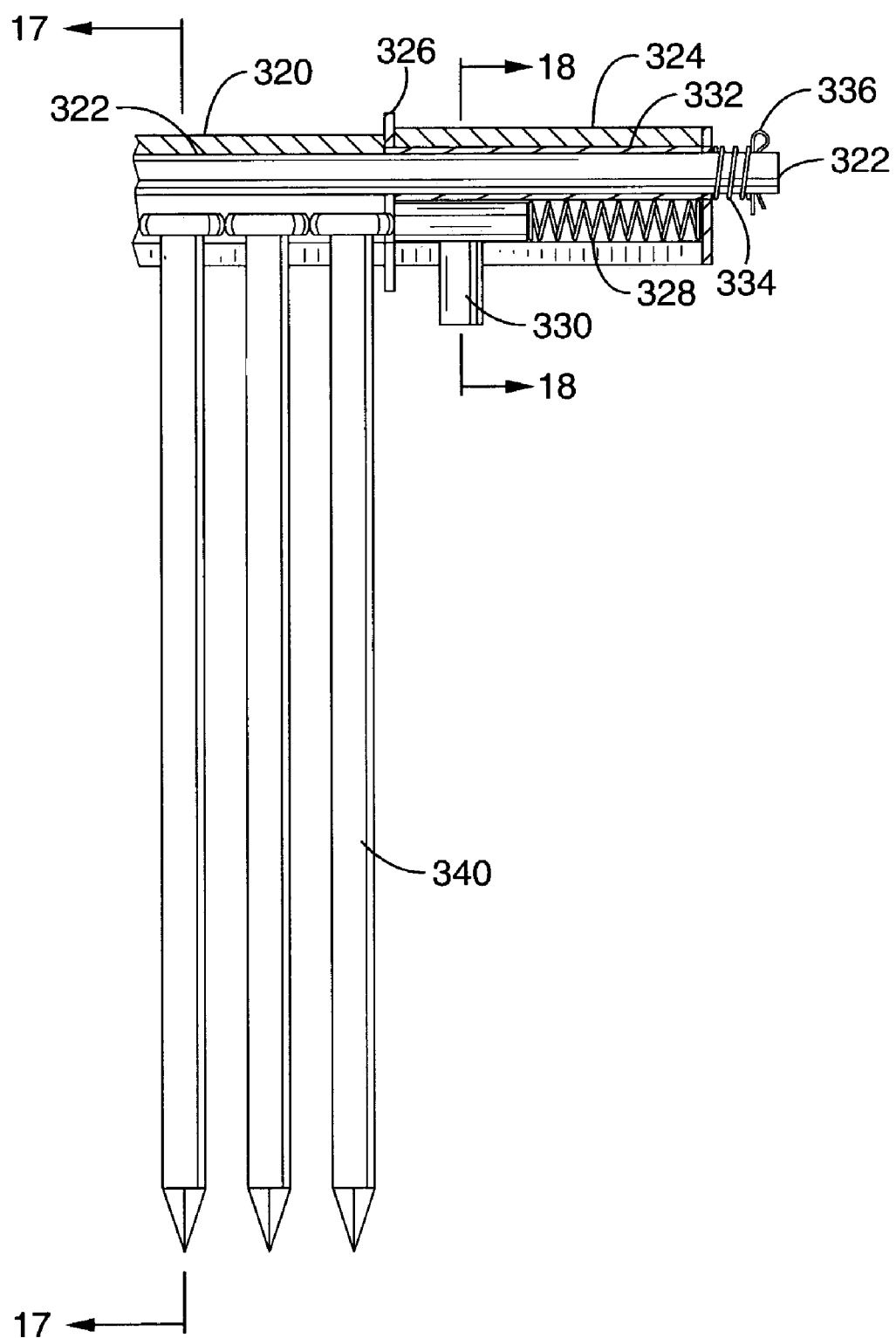
FIG. 15 is a side view of a spike magazine shown in the ready position.

FIG. 15 through FIG. 18 are illustrations of the loading end of spike magazine tube 320. FIG. 15 shows magazine tube 320 in the ready position. Spike pusher rod spring 328 presses spike pusher rod 330 against the head of spike 340. When the front spike 340 is driven out of spike receiver 310 as shown in FIG. 14, the next spike 340 is moved into spike receiver 310 and seated on spike swing arm 312 by action of spike pusher rod spring 328 and spike pusher rod 330 as shown in FIG. 13.

FIG. 16 is a detail of magazine tube 320 with spike magazine loading tube 324 in the loading position. Spike pusher rod 330 is pulled back into spike magazine loading tube 324 and past spike magazine backing plate 326. Spike magazine loading tube 324 is rotated past 90 degrees around spike retainer rod 322 on spike magazine loading tube bushing 332 and away from the bottom of spike magazine tube 322. Spike magazine loading tube 324 is retained on spike retainer rod 322 by retaining spring 334 and retaining pin 336. Spike pusher rod 330 is retained in spike magazine loading tube 324 by backing plate 326. Spike 340 is inserted in magazine tube 320 at backing plate 326. Spike magazine loading tube 324 is then returned to the ready position illustrated in FIG. 15.

FIG. 17 shows a cross section of magazine tube 320 with spike retaining rod 322 positioned to keep the head of spike 340 in the bottom of magazine tube 320 and to prevent the heads of spikes 340 from overlapping.

FIG. 18 shows a cross section of magazine loading tube 324 with spike pusher rod 330 riding beneath spike magazine loading tube bushing 332 and spike retaining rod 322.

Figure 19:
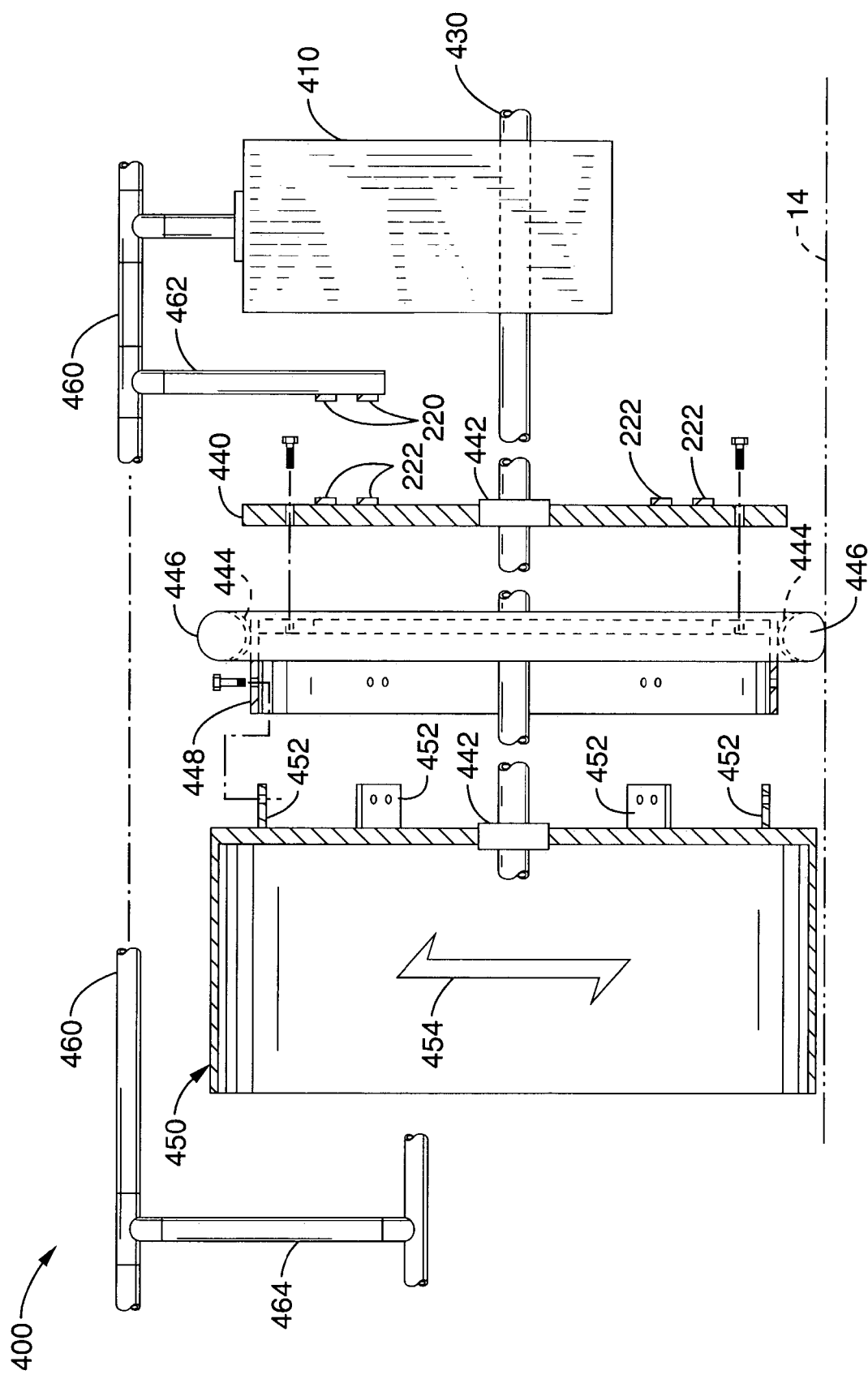
FIG. 19 is an exploded side view of a preferred embodiment of a painting system according to the present invention.

FIG. 19 is an exploded detail view of a preferred embodiment of painting system 400. Painting system support shaft 430 is coupled to painting system support arm 410 and supports wheel bearing 442. Contact wheel hub 440 rotates on wheel bearing 442 and around shaft 430. Contact wheel rim 444 and contact wheel tire 446 are coupled to the outer surface of contact wheel hoop 448 as an assembly which is coupled to contact wheel hub 440. Drum assembly 450 is coupled to contact wheel hoop 448 with drum tabs 452. Utility symbol cutout 454 is cut in drum assembly 450. Painting control bar 460 supports contact wheel control bracket 462 where contact wheel sensors 220 signal controller 200 (see FIG. 11) the position of contact wheel markers 222. Painting control bar 460 also supports painting control bracket 464 that supports a painting dispenser (FIG. 22 and FIG. 23) and painting system control wires (not shown).

Figure 20:
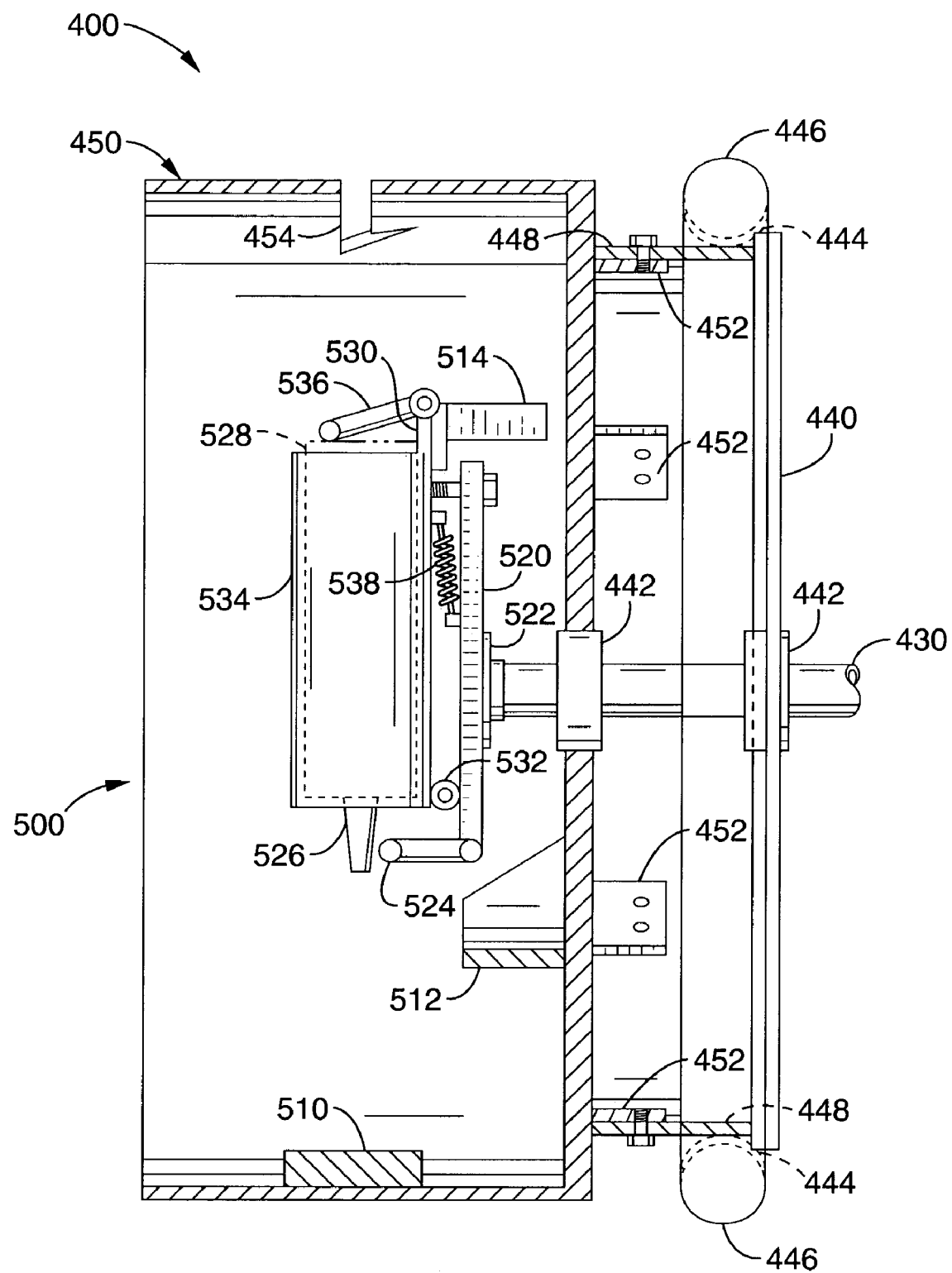
FIG. 20 is an cutaway view of a kinetic actuated painting system using cans of marking paint according to the present invention shown in the ready position.

FIG. 20 is a cross section view of a preferred embodiment of a kinetic actuated paint dispenser mechanism 500 associated with painting system 400, which uses aerosol paint cans. Paint dispenser mechanism 500 is shown in the ready position in FIG. 20. Contact wheel hub 440 is supported on painting support shaft 430 on wheel bearing 442. Contact wheel rim 444 and contact wheel tire 446 are coupled to the outer surface of contact wheel hoop 448 as an assembly which is coupled to contact wheel hub 440. Drum assembly 450 is coupled to contact wheel hoop 448 with drum tabs 452. Utility symbol cutout 454 is cut in drum assembly 450. Counterweight 510 is mounted inside drum assembly 450 and opposite utility symbol cutout 454. Drum cam 512 is mounted inside the hub of drum assembly 450 and approximately adjacent to counterweight 510. When contact wheel tire 446 is not in contact with pavement 14, counterweight 510 rotates paint drum assembly 450 until it rests at the bottom of paint drum assembly 450 and drum cam 512 is not in contact with cam follower 514. Trigger support plate 520 is mounted to painting support shaft 430 with flange 522. Paint nozzle trigger bar 524 is configured to rest beside the nozzle 526 of paint can 528 when drum cam 512 is not in contact with cam follower 514. Paint can holder backing plate 530 is coupled to trigger support plate 520 at paint support hinge 532 and configured to tilt outward when drum cam 512 contacts cam follower 514. Aerosol paint can 528 is secured in paint can holder 534 with paint can retainer clip 536. Paint support spring 538 keeps paint can holder backing plate 530 upright in the ready position.

Figure 21:
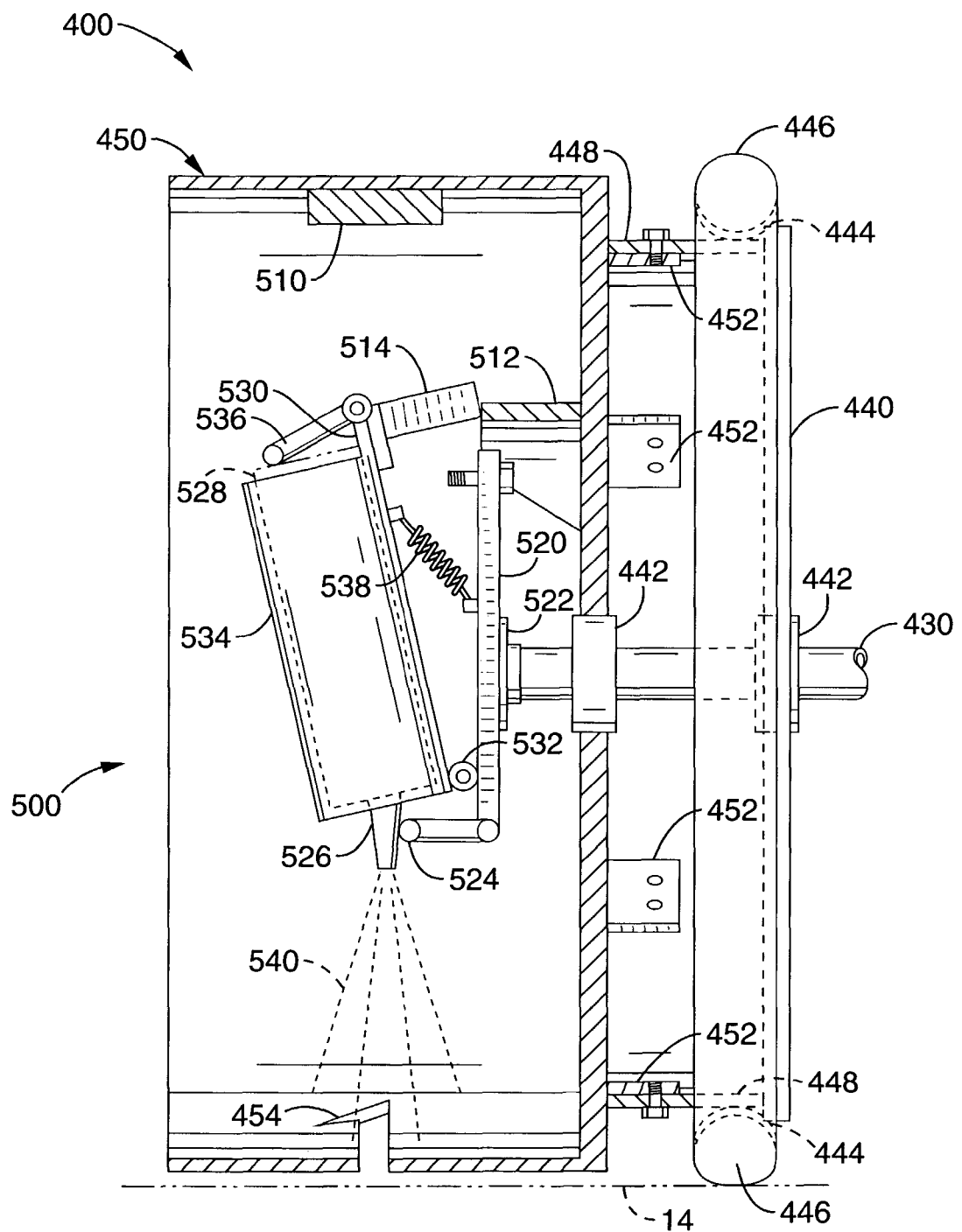
FIG. 21 is a cutaway of the kinetic actuated painting system of FIG. 20 applying paint.

FIG. 21 is a cross section view of the paint dispenser in FIG. 20 shown in the painting position. Support shaft 430 is lowered until contact wheel tire 446 contacts pavement 14, and rotates paint drum assembly 450 around support shaft 430 on wheel bearing 442. Drum cam 512 rotates and contacts cam follower 514 and tilts paint can holder backing plate 530 outward. Paint can nozzle 526 presses against paint can nozzle trigger bar 524 and discharges paint 540 downward and through utility symbol cutout 454 onto pavement 14. When support shaft 430 is raised and contact wheel tire 446 is no longer in contact with pavement 14, counterweight 510 rotates to the bottom of drum assembly 450 which disengages cam follower 514 from drum cam 512. Paint support spring 538 returns paint can holder backing plate 530 upright and disengages paint nozzle 526 from paint nozzle trigger rod 524 as shown in FIG. 20.

Figure 22:
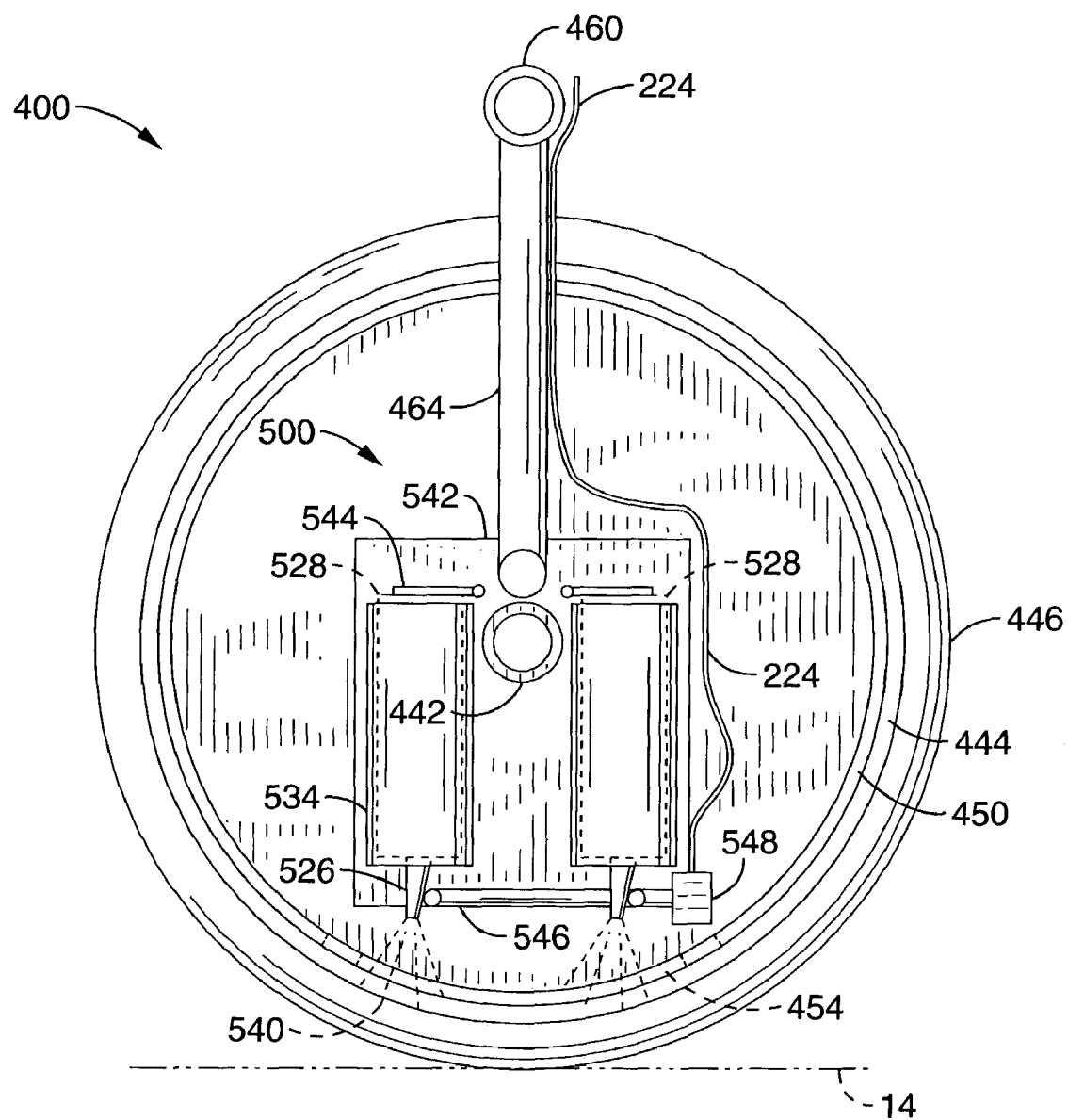
FIG. 22 is a side view of a painting system using cans of marking paint according to the present invention.

FIG. 22 is a side view of another embodiment of paint dispenser 500 using aerosol paint cans 528 as a paint source. The paint can holder plate 542 is supported inside template drum 450 by painting control bar 460 and painting control bracket 464. Paint cans 528 are mounted in paint can holder 534 with paint nozzle 526 pointing downward and are retained with paint can retaining clips 544. Paint nozzle trigger 546 is positioned next to paint nozzle 526. When painting a symbol is desired, controller 200 (see FIG. 11) positions painting assembly 400 until contact wheel 446 contacts pavement and utility symbol cutout 454 is adjacent to pavement 14. Controller 200 then activates solenoid 548 through control wire 224. Solenoid 548 moves paint nozzle trigger 546 to press against paint nozzle 526 initiating an aerosol flow of paint 540 down through utility symbol cutout 454 in drum assembly 450 and onto pavement 14.

Figure 23:
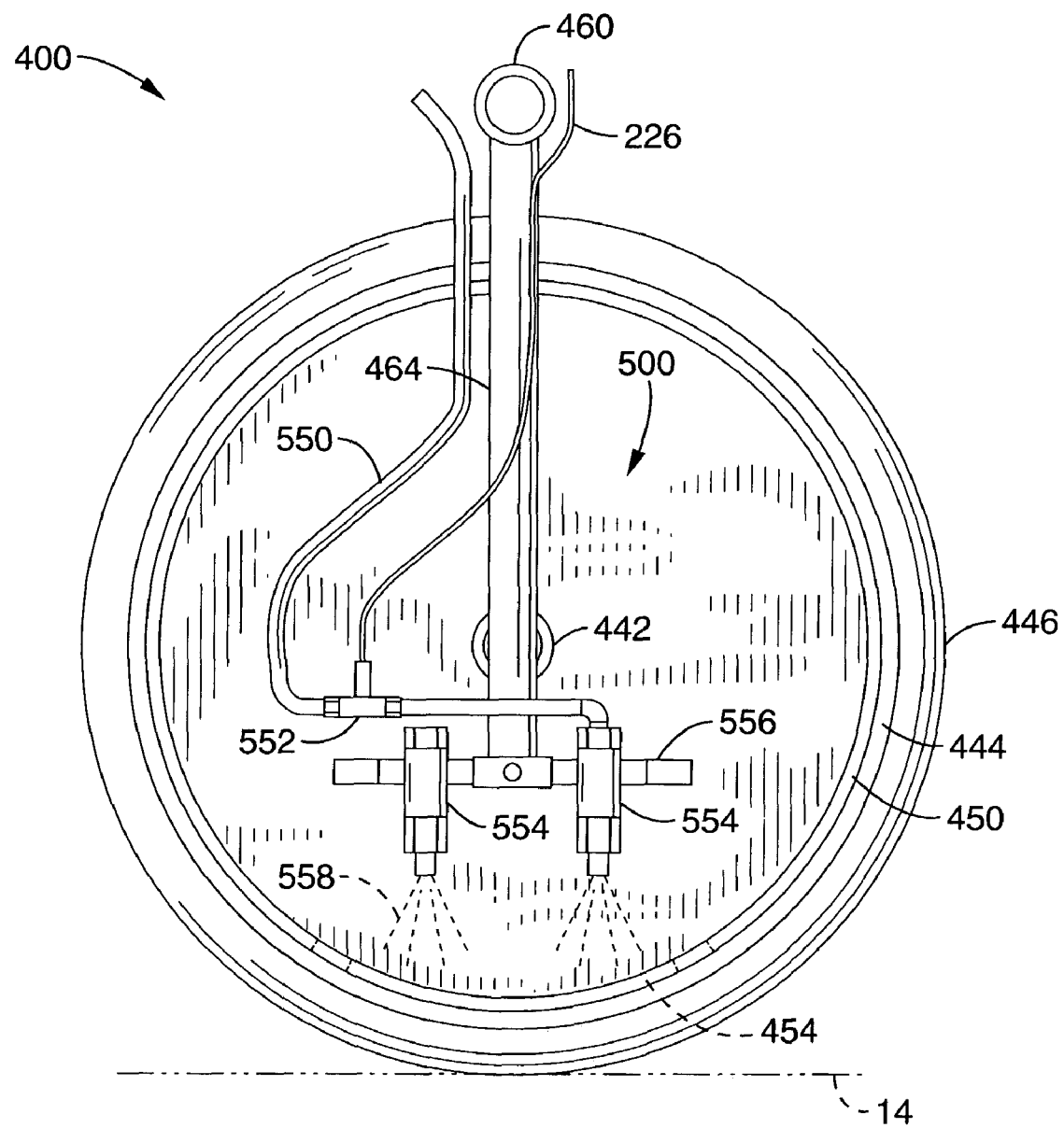
FIG. 23 is a side view of a painting system using an airless spray system as a paint source according to the present invention.

FIG. 23 is an elevation view of another embodiment of a painting dispenser 500 using an airless paint system (not shown), supported in vehicle 22 (see FIG. 1) that flows paint through paint hose 550 to solenoid valve 552. Airless paint nozzles 554 are mounted on airless paint nozzle bracket 556 which is supported in drum 450 by painting control bar 460 and painting control bracket 464. When painting a symbol is desired, controller 200 (see FIG. 11) positions painting assembly 400 until contact wheel 446 contacts pavement and utility symbol cutout 454 is in position, then activates solenoid valve 552 through control wire 226. Paint 558 dispenses downward through paint nozzles 554 and through utility symbol cutout 454 in drum assembly 450 and onto pavement 14.

Figure 24:
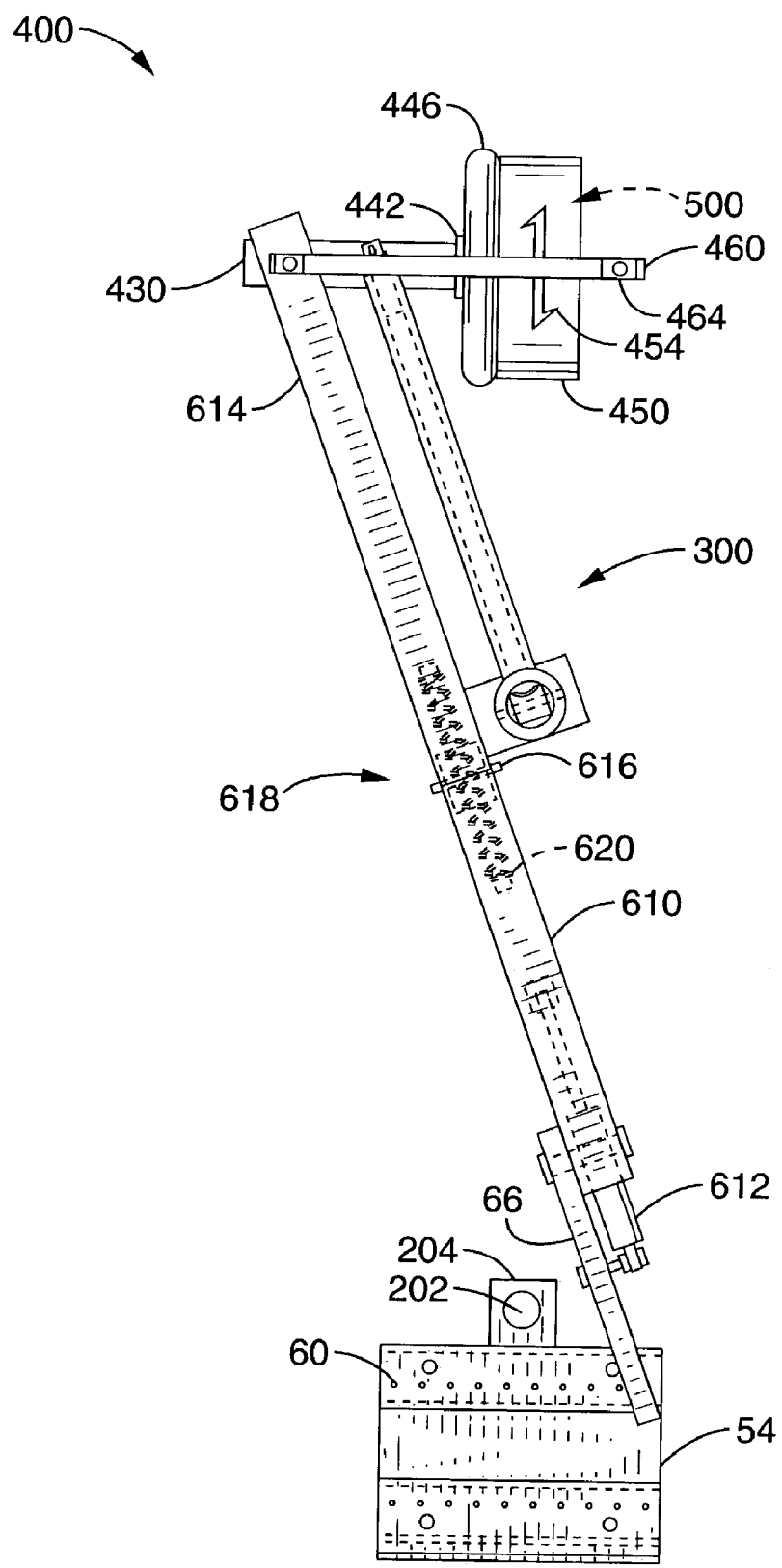
FIG. 24 is a top view of an embodiment of an arm support structure with a knee joint to support a painting system and a spike driver system according to the present invention.

FIG. 24 is a top view of a preferred embodiment of the present invention showing a two-part arm support system for a spike driver system 300 and a painting system 400. Main support arm 610 is attached to carriage top member 54 through support mount 66. Secondary support arm 614 is connected to main support arm 610 at pivot pin 616 to form a knee joint 618 where secondary support arm 614 flexes upward relative to main support arm 610. Spring 620 is attached below pivot pin 616. Spike driver system 300 (see FIG. 12) is attached to secondary arm 614 adjacent to knee joint 618. Paint system 400 (see FIG. 19) is attached to the end of secondary support arm 614 through support shaft 430. Spike driver system 300 and painting system 400 are configured to align with the position of utility detector 202. Main lift ram 612 raises or lowers main support arm 610 in response to signals from controller 200 (see FIG. 11). In ready position, main support lift ram 612 positions paint spike system 300 and paint system 400 above pavement and ground. When painting a symbol is desired, main support arm 610 is lowered until contact wheel tire 446 contacts pavement (see FIG. 21). Knee joint 618 remains in a straight configuration. Contact wheel tire 446 rotates drum 450 with utility symbol cutout 454. A paint dispenser 500 (see FIG. 20 through FIG. 23) is mounted inside template drum 450 and supported by painting control bar 460 and painting control bracket 464. Controller 200 signals paint dispenser 500 to dispense paint downward when utility symbol, cutout 454 is at the bottom of the rotation of drum assembly 450. When a utility symbol has been painted, controller 200 signals paint dispenser 500 to stop dispensing paint and signals main support lift ram 612 to return to the ready position. When a spike in the ground is desired, main support arm 610 is lowered by main support ram 612 until contact wheel tire 446 contacts ground. Main support arm 610 is further lowered causing knee joint 618 to flex at knee pin 616 toward the ground and lowers spike driver assembly 300 near the ground where a spike is driven into the ground (see FIG. 14). When main support arm 610 is raised to a ready position by main support ram 612, knee joint 618 return to a straight configuration through the weight of painting system 400 and the contraction of spring 620.

Figure 25:
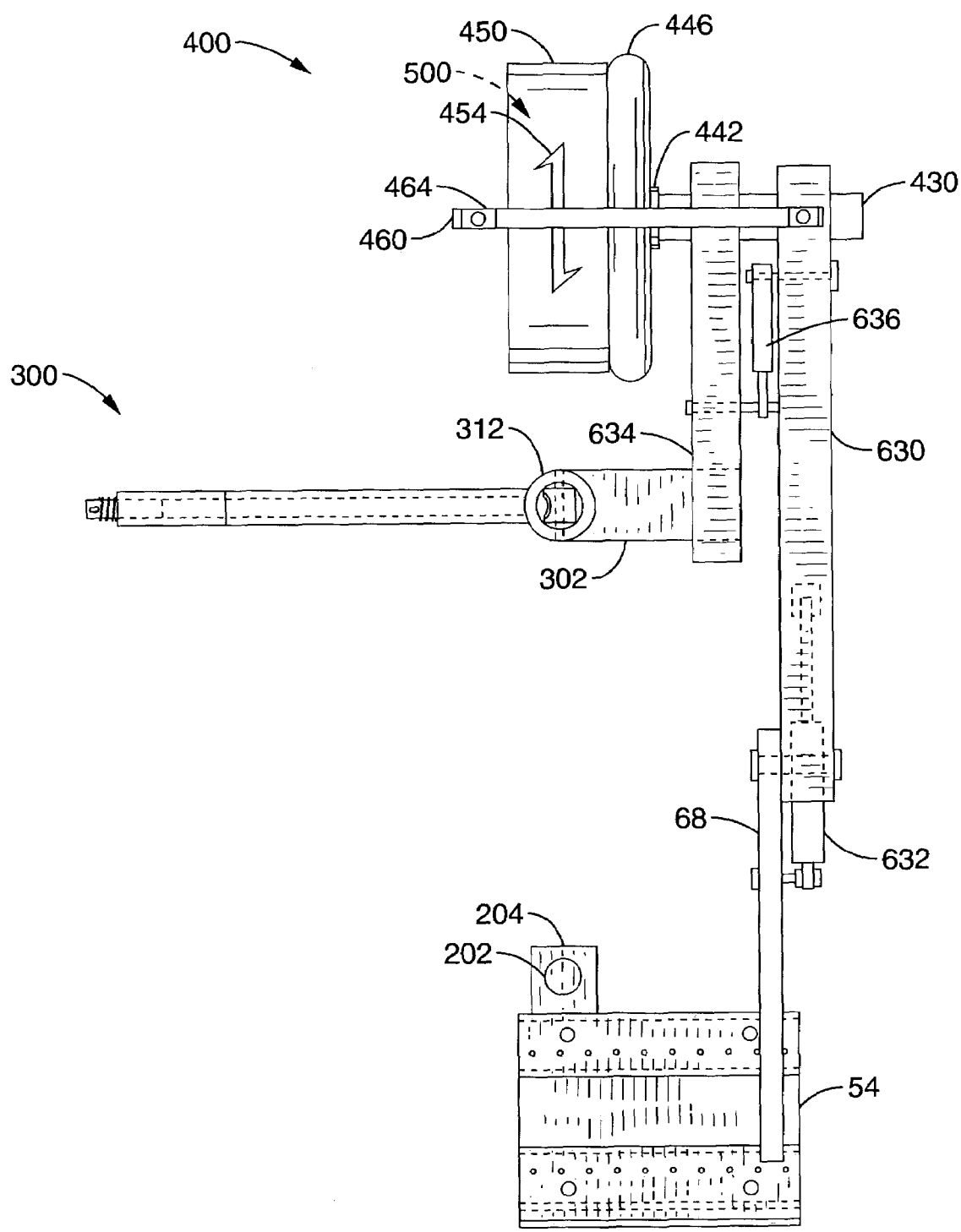
FIG. 25 is a top view of an embodiment of a support structure with a primary arm to support a painting system and a secondary arm to support a spike driver system according to the present invention.

FIG. 25 illustrates another embodiment of a support system of the present invention. Primary support arm 630 is attached at the first end to carriage top member 54 through primary support mount 68. Primary lift ram 632 raises or lowers primary support arm 630 in response to signals from controller 200 (see FIG. 11). Painting system support shaft 430 is connected to the second end of primary support arm 630 and supports the painting system 400 and spike driver support arm 634. Spike driver support arm 634 is supported on painting system support shaft 430 at the first end, and supports spike driver system 300 at the second end. Spike driver lift ram 636 is connected to primary support arm 630 and spike driver support arm 634 and raises or lowers spike driver support arm 634 in response to signals from controller 200. Spike driver system 300 and painting system 400 are configured to align with the position of utility detector 202. In painting mode, primary support arm 630 is lowered by primary lift ram 632 until contact wheel tire 446 contacts pavement. Contact wheel tire 446 rotates drum assembly 450 and paint is dispensed downward through utility symbol cutout 454. A paint dispenser 500 (see FIG. 20 through FIG. 23) is supported in drum 450 by painting control bar 460 and painting control bracket 464. In spike driver mode, primary support arm 630 is lowered by primary lift ram 632 until contact wheel tire 409 contacts ground. Spike driver lift ram 636 lowers spike driver support arm 634 until spike driver system 300 is near the ground and controller 200 (see FIG. 11) signals spike driver ram 312 to place a spike in the ground. Primary support arm 630 and spike driver arm 634 are then raised to the ready position.

Figure 26:
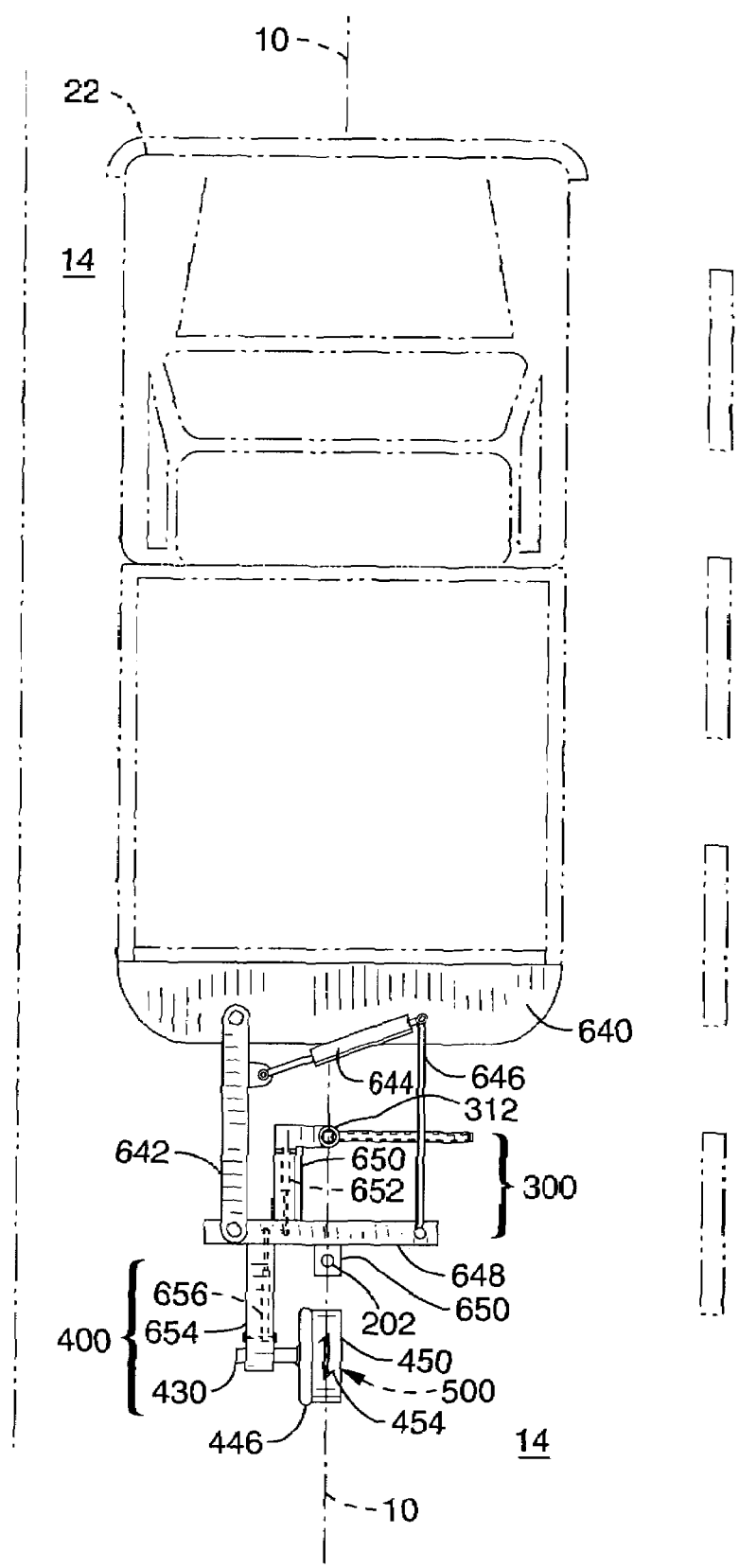
FIG. 26 is a top view of an embodiment of the invention with an articulating arm to support a paint system and a spike driver system.

FIG. 26 is a top view of an alternate embodiment of the present invention with an articulating support structure. Support platform 640 is attached to vehicle 22. Articulating arm 642 is attached pivotally to support platform 28 and is positioned by articulating arm ram 644. Guide arm 646 is attached pivotally to platform 640 and is used to keep support beam 648 parallel to support platform 640. Utility detector mount 650 supports utility detector 202 and is mounted on support beam 648. Spike driver system 300 is aligned with utility detector 202 and coupled to support beam 648 with alternate spike driver support arm 650 and is positioned with alternate spike driver ram 652. Painting system 400 is aligned with utility detector 202 and coupled to alternate paint support arm 654 through support shaft 430 which is coupled to support beam 648 and positioned with alternate paint support ram 656. Signals from utility detector 202 through controller 200 (see FIG. 11) position support beam 648 over underground utility 10 through articulating arm ram 644. When painting is desired, controller 200 signals alternate paint support ram 656 to lower-alternate paint support arm 654 until contact wheel tire 446 contacts pavement 14. A paint dispenser 500 (see FIG. 20 through FIG. 23) within drum assembly 450 dispenses paint downward through utility symbol cutout 454 as drum assembly 450 rotates. Alternate paint support ram 656 then returns alternate paint support arm 654 to a ready position. When placing a spike is desired, controller 200 signals alternate spike driver ram 652 to lower alternate spike driver support arm 650 and then signals spike driver ram 312 to drive a spike in the ground. Spike driver ram 652 then returns alternate spike driver support arm 650 to a ready position.

Figure 27:
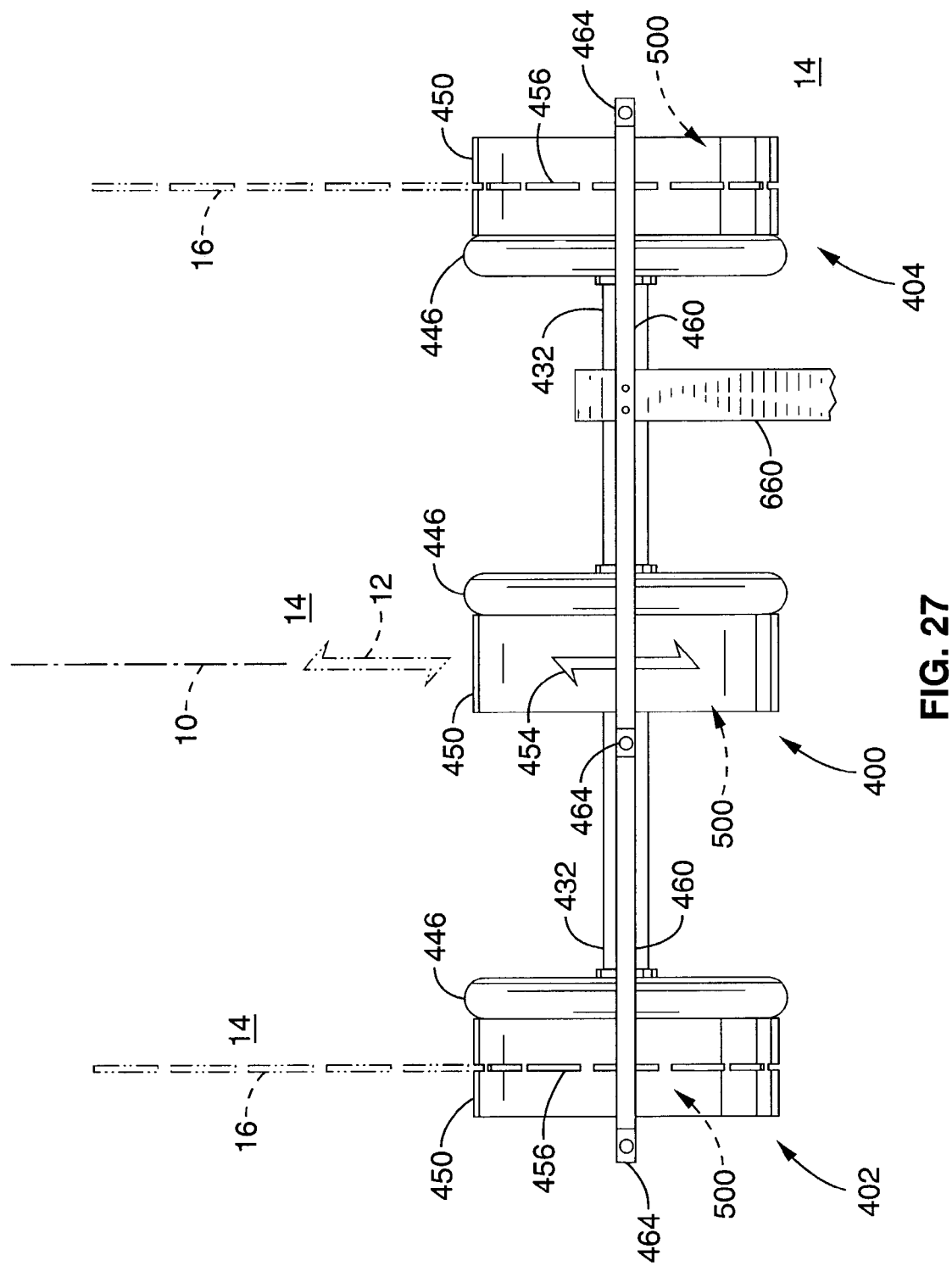
FIG. 27 is a top view of a painting system configured for offset marking according to the present invention.

FIG. 27 is another embodiment of a painting system configured to a utility symbol with additional offset marks to guide excavation crews. Details of a support structure have been omitted for clarity. First end of offset support arm 660 (not shown) is connected to a carriage assembly as shown in FIG. 25. Second end of support arm 660 supports offset support shaft 432. Painting assembly 400 is mounted on offset support shaft 432 and aligned with utility detector 202 as shown in FIG. 25. Two additional painting assemblies, 402 and 404, are mounted on offset support shaft 432 outboard of painting system 400. Outboard painting system drum assemblies 450 have offset template cutout 456. When painting is desired, support arm 660 is lowered as described in FIG. 25. Contact wheel tires 446 on painting assemblies 400, 402 and 404 contact pavement 14. All three drum template assemblies 450 rotate around offset support shaft 432 resulting in a utility mark 12 vertical of underground utility 10 and two outboard offset marks 16 on pavement 14. Painting control bar 460 and painting control brackets 464 support paint dispensers 500 and control wires as shown in FIG. 20 through FIG. 23.

Figure 28:
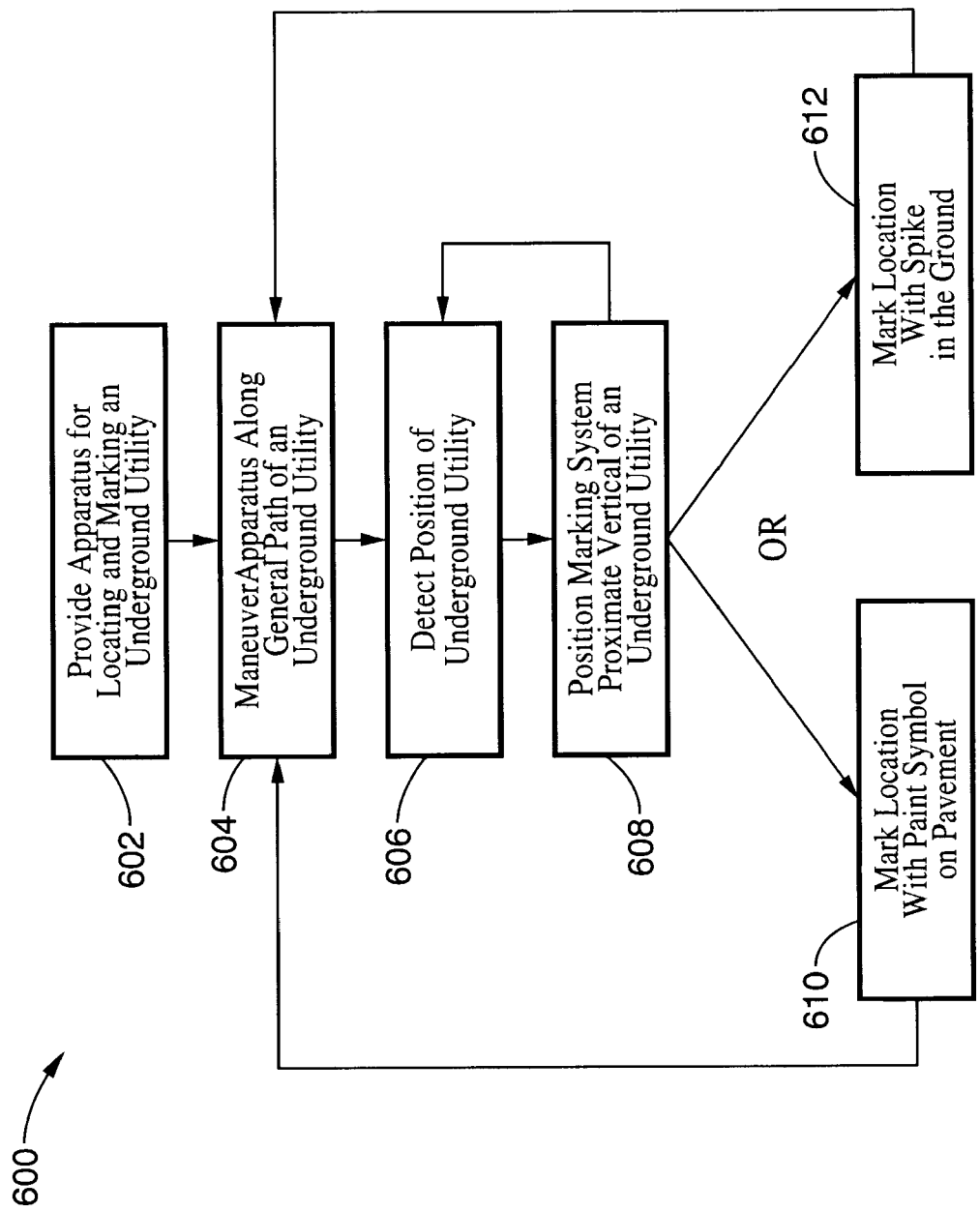
FIG. 28 is a flow chart illustrating a method for locating and marking an underground utility according to the present invention.

FIG. 28 shows a flow chart 600 of a method to locate and mark the surface position of an underground utility using an embodiment of the present invention. Initially in step 602, an apparatus for locating and marking an underground utility is provided. Said apparatus generally comprises a chassis, a carriage, a carriage actuator, a utility detector, a controller, a paint marking means and a spike driver means as illustrated in FIG. 1 through FIG. 27. Step 604 comprises maneuvering said apparatus along the general path of an underground utility where marking the surface position of an underground utility is desired. In step 606, an underground utility detector locates an underground utility and transmits positional signals to said controller. In step 608, said carriage is positioned proximate vertical of the underground utility location in response to positional signals from said controller through said carriage actuator. As the position of said carriage changes, positional signals from said underground utility detector change providing a continuing positioning of said carriage proximate vertical of an underground utility. In step 610, said paint marking system, aligned with the position of said carriage, applies a paint symbol on pavement to mark the proximate vertical position of an underground utility. Alternatively in step 612, said spike driver system, aligned with the position of said carriage, inserts a spike in ground to mark the proximate vertical position of an underground utility. After a mark has been applied, said apparatus continues to maneuver along a path of an underground utility, step 604, to repeat the marking process.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C.112, sixth paragraph, unless the element is expressly recited using the phrase "means for."

What is claimed is:

1. An underground utility locating and marking apparatus, comprising:
    a support structure configured to maneuver along a proximate path of an underground utility;
    means carried by said support structure for locating a proximate vertical position of said underground utility;
    means carried by said support structure for marking the located position of said underground utility;
    an articulating arm coupling said means for marking to said support structure; and
    means for positioning said articulating arm in response to signals from said means for locating.

2. An apparatus as recited in claim 1, wherein said means for marking the located position of said underground utility comprises a paint sprayer.

3. An underground utility locating and marking apparatus comprising:
    a support structure configured to maneuver along a proximate path of an underground utility;
    means carried by said support structure for locating a proximate vertical position of said underground utility; and
    means carried by said support structure for marking the located position of said underground utility;
    wherein said means for locating a proximate vertical position of said underground utility comprises:
    a detector that produces a positional signal indicative of the position an underground utility; and
    a controller that positions said means for marking the located position of said underground utility at a position proximate said underground utility in response to said positional signal.

4. An apparatus as recited in claim 1, wherein said means for locating a proximate vertical position of said underground utility comprises:
    detector means for producing a positional signal relative to a proximate vertical position of an underground utility; and
    position indicating means for indicating proximate vertical position of an underground utility based on said positional signal.

5. An apparatus as recited in claim 3, wherein said detector means comprises a detector selected from the group consisting essentially of a radio frequency detector, a ground penetrating radar detector, a sonic detector, and an electromagnetic detector.

6. An apparatus as recited in claim 3, wherein said means for locating a proximate vertical position of said underground utility comprises:
    a carriage coupled to said support structure;
    said carriage configured to move horizontally and laterally to the direction of movement of said support structure and indicate a surface position for marking; and
    a carriage actuator cooperating with said support structure and with said carriage to position said carriage at a vertical position of an underground utility in response to control signals from said controller.

7. An apparatus as recited in claim 3, wherein said controller comprises a microprocessor configured to receive positional signals from said detector means and to generate control signals to said position indicating means.

8. An apparatus as recited in claim 3, wherein said means for locating a proximate vertical position of said underground utility further comprises:
    an articulating arm assembly having a first end and a second end;
    said first end of said articulating arm assembly coupled to said support structure and configured to articulate said second end of said articulating arm assembly horizontally and laterally to the direction of movement of said support structure; and said second end of said articulating arm assembly configured to indicate a vertical surface position of an underground utility in response to control signals from said controller.

9. An apparatus as recited in claim 3, wherein said means for locating a proximate vertical position of said underground utility further comprises:
an articulating arm assembly having a first end and a second end;
said first end of said articulating arm assembly coupled to said support structure and configured to articulate said second end of said articulating arm assembly horizontally; and
an articulating arm actuator cooperating with said support structure and with said first end of said articulating arm assembly to position said second end of said articulating arm assembly at a vertical position of said underground utility in response to control signals from said controller;
whereby said means for marking the located position of said underground utility responds to control signals from said controller by marking the located position of said underground utility.

10. An apparatus as recited in claim 3, wherein said means for marking the located position of said underground utility further comprises:
a painting system support structure having a first end and a second end;
a painting system support shaft oriented horizontally and coupled to said second end of said painting support structure;
an actuator coupled to said first end of said painting system support structure and configured to position said second end of said painting system support structure in response to control signals from said controller;
a contact wheel assembly oriented vertically and coupled to said painting system support shaft and configured to rotate on said painting system support shaft;
a drum template coupled to said contact wheel assembly; and
a paint dispenser coupled to said painting system support shaft configured to dispense paint downward through said drum template;
whereby, in response to control signals from said controller, said actuator positions said second end of said painting system support structure until said contact wheel contacts a surface, said contact wheel rotates said drum template, and said paint dispenser dispenses paint through said drum template onto said surface to apply a symbol.

11. An apparatus as recited in claim 3, wherein said means for marking the located position of said underground utility comprises:
a spike system support structure having a first end and a second end;
an actuator coupled to said first end of said spike system support structure and configured to position said second end of said spike system support structure in response to control signals from said controller;
a spike magazine configured to hold a plurality of spikes coupled to said spike system support structure;
a spike receiver configured to aim a spike downward and coupled to said second end of said spike system support structure and configured to receive a spike from said spike magazine; and
a spike driver coupled to said spike receiver and said spike system support structure;
whereby, in response to control signals from said controller, said support actuator positions said second end of said spike system support structure and said spike driver drives a spike downward through said spike receiver and into the ground.

12. An apparatus as recited in claim 3, wherein said means for marking the located position of said underground utility comprises:
a painting system support structure having a first end and a second end;
a painting system support shaft oriented horizontally and coupled to said second end of said painting system support structure;
a painting system actuator coupled to said first end of said painting system support structure and configured to position said second end of said painting system support structure in response to control signals from said controller;
a contact wheel assembly oriented vertically and coupled to said painting system support shaft and configured to rotate on said painting system support shaft;
a drum template coupled to said contact wheel assembly;
a paint dispenser coupled to said painting system support shaft configured to dispense paint downward through said drum template;
a spike system support structure having a first end and a second end, said first end configured to align with said carriage;
a spike system support actuator coupled to said first end of said spike system support structure and configured to position said second end of said spike system support structure in response to control signals from said controller;
a spike magazine configured to hold a plurality of spikes coupled to said spike system support structure;
a spike receiver configured to aim a spike downward and coupled to said second end of said spike system support structure and configured to receive a spike from said spike magazine; and
a spike driver coupled to said spike receiver and said spike system support structure;
whereby, in response to control signals from said controller, said painting system actuator positions said second end of said painting system support structure until said contact wheel contacts a surface, said contact wheel rotates said drum template, and said paint dispense dispenses paint through said drum template onto said surface to apply a symbol; and
whereby, in response to control signals from said controller, said spike system support actuator positions said second end of said spike system support structure and said spike driver drives a spike downward through said spike receiver and into the ground.

13. An underground utility locating and marking apparatus, comprising:
a support structure configured to maneuver along a proximate path of an underground utility;
a painting system coupled to said support structure;
a detector coupled to said support structure that produces a positional signal indicative of the proximate vertical position an underground utility; and
a controller coupled to said support structure that positions said painting system at a position proximate said underground utility in response to said positional signal.

14. An apparatus as recited in claim 13, wherein said detector comprises a detector selected from the group consisting essentially of a radio frequency detector, a ground penetrating radar detector, a sonic detector, and an electromagnetic detector.

15. An apparatus as recited in claim 13, wherein said painting system comprises:
   a painting system support structure having a first end and a second end;
   a painting system support shaft oriented horizontally and coupled to said second end of said painting support structure;
   an actuator coupled to said first end of said painting system support structure and configured to position said second end of said painting system support structure in response to control signals from said controller;
   a contact wheel assembly oriented vertically and coupled to said painting system support shaft and configured to rotate on said painting system support shaft;
   a drum template coupled to said contact wheel assembly; and
   a paint dispenser coupled to said painting support shaft configured to dispense paint downward through said drum template;
   whereby, in response to control signals from said controller, said actuator positions said second end of said painting system support structure until said contact wheel contacts a surface, said contact wheel rotates said drum template, and said paint dispenser dispenses paint through said drum template onto said surface to apply a symbol.

16. An apparatus as recited in claim 13, further comprising:
   an articulating arm assembly having a first end and a second end;
   said first end of said articulating arm assembly coupled to said support structure and configured to articulate said second end of said articulating arm assembly horizontally;
   an articulating arm actuator cooperating with said support structure and with said first end of said articulating arm assembly to position said second end of said articulating arm assembly at a vertical position of said underground utility in response to control signals from said controller;
   whereby said painting system responds to control signals from said controller by marking the located position of said underground utility.

17. An underground utility locating and marking apparatus, comprising:
   a support structure configured to maneuver along a proximate path of an underground utility;
   a spike driving system coupled to said support structure;
   a detector coupled to said support structure that produces a positional signal indicative of the proximate vertical position an underground utility; and
   a controller coupled to said support structure that positions said spike driving system at a position proximate said underground utility in response to said positional signal.

18. An apparatus as recited in claim 17, wherein said detector comprises a detector selected from the group consisting essentially of a radio frequency detector, a ground penetrating radar detector, a sonic detector, and an electromagnetic detector.

19. An apparatus as recited in claim 17, wherein said spike driving system comprises:
   a spike driving system support structure having a first end and a second end;
   an actuator coupled to said first end of said spike system support structure and configured to position said second end of said spike system support structure in response to control signals from said controller;
   a spike magazine configured to hold a plurality of spikes coupled to said spike system support structure;
   a spike receiver configured to aim a spike downward and coupled to said second end of said spike system support structure and configured to receive a spike from said spike magazine; and
   a spike driver coupled to said spike receiver and said spike system support structure;
   whereby, in response to control signals from said controller, said actuator positions said second end of said spike system support structure and said spike driver drives a spike downward through said spike receiver and into the ground.

20. An apparatus as recited in claim 17, further comprising:
   an articulating arm assembly having a first end and a second end;
   said first end of said articulating arm assembly coupled to said support structure and configured to articulate said second end of said articulating arm assembly horizontally; and
   an articulating arm actuator cooperating with said support structure and with said first end of said articulating arm assembly to position said second end of said articulating arm assembly at a vertical position of said underground utility in response to control signals from said controller;
   whereby said spike driving system responds to control signals from said controller by marking the located position of said underground utility.

21. An underground utility locating and marking apparatus, comprising:
   a support structure configured to maneuver along a proximate path of an underground utility;
   a paint spraying system coupled to said support structure;
   a spike driving system coupled to said support structure;
   a detector coupled to said support structure that produces a positional signal indicative of the proximate vertical position an underground utility; and
   a controller coupled to said support structure that positions said paint spraying system and said spike driving system at a position proximate said underground utility in response to said positional signal.

22. An apparatus as recited in claim 21, wherein said detector comprises a detector selected from the group consisting essentially of a radio frequency detector, a ground penetrating radar detector, a sonic detector, and an electromagnetic detector.

23. An apparatus as recited in claim 21, wherein said paint spraying system comprises:
   a paint system support structure having a first end and a second end;
   a paint system shaft oriented horizontally and coupled to said second end of said painting support structure;
   an actuator coupled to said first end of said painting support structure and configured to position said second end of said painting support structure in response to control signals from said controller;
   a contact wheel assembly oriented vertically and coupled to said painting support shaft and configured to rotate on said painting support shaft;
   a drum template coupled to said contact wheel assembly; and a paint dispenser coupled to said painting support shaft configured to dispense paint downward through said drum template;

whereby, in response to control signals from said controller, said actuator positions said second end of said painting system support structure until said contact wheel contacts a surface, said contact wheel rotates said drum template, and said paint dispenser dispenses paint through said drum template onto said surface to apply a symbol.

24. An apparatus as recited in claim 21, wherein said spike driving system comprises:

a spike driving system support structure having a first end and a second end;

an actuator coupled to said first end of said spike system support structure and configured to position said second end of said spike system support structure in response to control signals from said controller;

a spike magazine configured to hold a plurality of spikes coupled to said spike system support structure;

a spike receiver configured to aim a spike downward and coupled to said second end of said spike system support structure and configured to receive a spike from said spike magazine; and a spike driver coupled to said spike receiver and said spike system support structure;

whereby, in response to control signals from said controller, said actuator positions said second end of said spike system support structure and said spike driver drives a spike downward through said spike receiver and into the ground.

25. An apparatus as recited in claim 21, further comprising:

an articulating arm assembly having a first end and a second end;

said first end of said articulating arm assembly coupled to said support structure and configured to articulate said second end of said articulating arm assembly horizontally; and an articulating arm actuator cooperating with said support structure and with said first end of said articulating arm assembly to position said second end of said articulating arm assembly at a vertical position of said underground utility in response to control signals from said controller;

whereby said paint spraying system and said spike driving system respond to control signals from said controller by marking the located position of said underground utility.

26. An underground utility symbol painting apparatus comprising:

a support structure configured to maneuver along a proximate path of an underground utility;

a controller configured to generate control signals;

a painting system support structure with a first end and a second end;

said first end of said painting system support structure configured to be coupled to said support structure;

a painting system support shaft oriented horizontally and coupled to said second end of said painting support structure;

an actuator coupled to said painting system support structure and configured to position said painting system support structure in response to control signals from said controller;

a contact wheel assembly oriented vertically and coupled to said painting system support shaft and configured to rotate on said painting support shaft;

a drum template coupled to said contact wheel assembly; and, a paint dispenser coupled to said painting support shaft;

whereby, in response to control signals from said controller, said actuator positions said painting system support structure until said contact wheel contacts a surface, said contact wheel rotates said drum template, and said paint dispenser dispenses paint through said drum template onto said surface to apply a symbol.

27. An apparatus as recited in claim 26, further comprising an underground utility detector coupled to said support structure that generates a positional signal relative to a vertical position above an underground utility.

28. An underground utility spike marking apparatus comprising:

a support structure configured to maneuver along a proximate path of an underground utility;

a controller configured to generate control signals;

a spike system support structure having a first end and a second end, said first end configured to be coupled to said support structure;

a spike system support actuator coupled to said first end of said spike system support structure and configured to position said spike system support structure in response to control signals from said controller;

a spike receiver oriented to drive a spike downward;

said spike receiver coupled to said second end of said spike system support structure and configured to receive a spike; and a spike driver associated with said spike receiver and said spike system support structure;

whereby, in response to control signals from said controller, said actuator positions said spike driving support structure and said spike driver drives a spike downward through said spike receiver.

29. An apparatus as recited in claim 28, further comprising an underground utility detector coupled to said support structure and configured to generate a positional signal relative to a vertical position above an underground utility.

30. An underground utility locating and marking apparatus comprising:

a chassis configured to maneuver along a proximate path of an underground utility;

a carriage coupled to said chassis to move horizontally and laterally to the direction of movement of said chassis;

an underground utility detector coupled to said carriage and that produces a positional signal relative to a vertical position above an underground utility;

a controller configured to receive positional signals from said underground utility detector and generate control signals;

a carriage actuator cooperating with said chassis and with said carriage to position said carriage at a vertical position of an underground utility in response to control signals from said controller;

a painting system support structure with a first end and a second end;

a painting system support shaft oriented horizontally and coupled to said second end of said painting system support structure;

a painting system actuator coupled to said painting support structure and configured to position said second end of said painting support structure in response to control signals from said controller;

a contact wheel assembly oriented vertically and coupled to said painting support shaft and configured to rotate on said painting support shaft;

a drum template coupled to said contact wheel assembly; and a paint dispenser coupled to said painting system support shaft configured to dispense paint downward through said drum template;

whereby, in response to control signals from said controller, said painting system actuator positions said second end of said painting system support structure until said contact wheel contacts a surface, then said contact wheel rotates said drum template and said paint dispenser dispenses paint through said drum template onto said surface to apply a symbol;

a spike system support structure with a first end and a second end, said first end configured to align with said carriage;

a spike system support actuator coupled to said first end of said spike system support structure and configured to position said second end of said spike system support structure in response to control signals from said controller means;

a spike magazine configured to hold a plurality of spikes coupled to said spike system support structure;

a spike receiver configured to aim a spike downward and coupled to said second end of said spike system support structure and configured with said spike magazine to receive a spike from said spike magazine; and a spike driver coupled to said spike receiver and said spike system support structure;

whereby, in response to control signals from said controller, said spike system support actuator positions said second end of said spike system support structure and said spike driver drives a spike downward through said spike receiver and into the ground.

31. A method of locating and marking the surface position of an underground utility comprising the steps of:

providing a locating and marking apparatus comprising, a support structure, means for detecting a location of an underground utility, means for indicating a position proximate vertical of an underground utility, and means for marking a proximate vertical surface position of an underground utility;

providing motion to said apparatus along a general path an underground utility;

automatically positioning said means for marking proximate vertical of an underground utility with a means for positioning and in response to positional signals from said means for detecting; and marking the surface position proximate vertical of an underground utility with said means for marking.

32. A method as recited in claim 31, wherein said means for positioning comprises an articulating arm.

33. A method as recited in claim 31, wherein said means for marking is selected from the group consisting of a paint spraying system and a spike driving system.

* * * * *